(12) United States Patent
Moore et al.

(10) Patent No.: US 12,708,972 B2
(45) Date of Patent: Aug. 18, 2026

(54) SYSTEM AND METHOD FOR POST-CURE PROCESSING OF A COMPOSITE WORKPIECE

(71) Applicant: The Boeing Company, Chicago, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 732 days.

(21) Appl. No.: 18/048,892

(22) Filed: Oct. 24, 2022

(65) Prior Publication Data

US 2023/0136548 A1 May 4, 2023

Related U.S. Application Data

(60) Provisional application No. 63/274,982, filed on Nov. 3, 2021.

(51) Int. Cl.

| | |
|---|---|
| ***B23Q 15/24*** | (2006.01) |
| ***B23B 35/00*** | (2006.01) |
| ***B23B 49/02*** | (2006.01) |
| ***B23Q 3/06*** | (2006.01) |
| ***B23Q 35/128*** | (2006.01) |

(52) U.S. Cl.

CPC .............. *B23Q 15/24* (2013.01); *B23B 35/00* (2013.01); *B23B 49/02* (2013.01); *B23Q 3/062* (2013.01); *B23Q 35/128* (2013.01); *B23B 2226/27* (2013.01)

(58) Field of Classification Search

CPC ..... B23B 2226/27; B23B 35/00; B23B 49/02; B23Q 15/24; B23Q 3/062; B23Q 35/128

See application file for complete search history.

(56) References Cited

U.S. PATENT DOCUMENTS

| | | | |
|---|---|---|---|
| 4,382,728 | A | 5/1983 | Anderson et al. |
| 4,486,128 | A | 12/1984 | Baker et al. |
| 5,088,609 | A | 2/1992 | Fryc |
| 5,457,868 | A | 10/1995 | Blaimschein |
| 5,653,005 | A | 8/1997 | Speller, Sr. et al. |
| 5,817,269 | A | 10/1998 | Younie et al. |

(Continued)

FOREIGN PATENT DOCUMENTS

| | | | |
|---|---|---|---|
| CN | 109383841 | A | 2/2019 |
| CN | 111829451 | A | 10/2020 |

(Continued)

OTHER PUBLICATIONS

Netherlands Patent Office, Search Report and Written Opinion, App. No. NL2029835 (Aug. 2, 2022).

(Continued)

*Primary Examiner* — Nicole N Ramos

(74) *Attorney, Agent, or Firm* — Walters & Wasylyna LLC

(57) ABSTRACT

A system for post-cure processing a composite workpiece includes a tool. The tool includes a tool surface. The tool surface supports the composite workpiece located on the tool. The system also includes a drill template. The drill template defines a drilling location for drilling a hole through the composite workpiece while the composite workpiece is on the tool.

20 Claims, 18 Drawing Sheets

(56) References Cited

U.S. PATENT DOCUMENTS 6,109,839 A * 8/2000 Thomas .................. B23B 49/02 408/241 B
6,430,796 B1 8/2002 Jones et al.
7,273,333 B2 9/2007 Buttrick et al.
7,334,673 B2 2/2008 Boberg et al.
7,574,933 B2 8/2009 Hazlehurst et al.
8,005,563 B2 8/2011 Cobb et al.
8,606,388 B2 12/2013 Cobb et al.
8,620,470 B2 12/2013 Cobb et al.
8,733,707 B2 5/2014 Stone
9,221,141 B1 12/2015 Xu
9,651,935 B2 5/2017 Stone
9,981,367 B2 5/2018 Nestleroad et al.
10,442,153 B2 10/2019 Shinozaki et al.
10,520,933 B2 12/2019 Stone et al.
10,710,327 B2 7/2020 Butler
10,711,815 B2 7/2020 Chan et al.
10,723,485 B2 7/2020 Moore et al.
10,906,158 B2 2/2021 Newton
10,919,746 B2 2/2021 Harada
11,007,766 B2 5/2021 Bye
2004/0217497 A1 11/2004 Engwall et al.
2005/0084344 A1 4/2005 Dods et al.
2005/0116105 A1 6/2005 Munk et al.
2005/0260051 A1 11/2005 Hamann
2005/0279612 A1 12/2005 Boberg et al.
2008/0084018 A1 4/2008 Baumann et al.
2009/0261201 A1 10/2009 Stone
2017/0001247 A1* 1/2017 White ................... B23B 47/287
2018/0099370 A1* 4/2018 Jesson .................... B23Q 35/42
2018/0118540 A1 5/2018 Stone et al.
2019/0049919 A1 2/2019 Knutson et al.
2019/0084193 A1 3/2019 Riedel
2020/0171624 A1 6/2020 Tai et al.
2020/0326689 A1 10/2020 Borowicz

FOREIGN PATENT DOCUMENTS

EP 3251776 A1 * 12/2017 ............. B23D 77/06
GB 2524768 A * 10/2015 ......... B23B 51/0054
RU 2500516 C1 2/2013
TW 201201933 A * 1/2012 ................ B26F 1/16
WO 2012132773 A1 10/2012

OTHER PUBLICATIONS

European Patent Office, Extended European Search Report, App. No. 22200597.7 (Mar. 14, 2023).
European Patent Office, Extended European Search Report, App. No. 25164328.4 (Jul. 14, 2025).
European Patent Office, "Communication pursuant to Article 94(3) EPC," App. No. 25 164 328.4 (May 26, 2026).
China National Intellectual Property Office, Office Action, App. No. 202211371253.0 (Jun. 25, 2026).
China National Intellectual Property Office, Office Action, App. No. 202211361080.4 (Jun. 25, 2026).

* cited by examiner 212
210
208
206
204
200
202
102
164
158
102
102
104
104
100

128
128
128
128
106
160
104

116
116
110
102
106
116
116
162
104

118
116
116
118
110
102
106
116
118
116
118
186
104

100
104
106
102
116
116
110
116
154
154
182
198
214
214
120
122

SYSTEM AND METHOD FOR POST-CURE PROCESSING OF A COMPOSITE WORKPIECE

PRIORITY

This application claims priority from U.S. Ser. No. 63/274,982 filed on Nov. 3, 2021.

FIELD

The present disclosure relates generally to composite manufacturing and, more particularly, to systems and methods for starting post-cure processing of a composite workpiece on a cure tool.

BACKGROUND

Composite parts are commonly used in applications where light weight and high strength are desired, such as in aircraft and vehicles. Typically, one or more machining or other processing operations are performed on the composite part, such as drilling holes, machining features, and trimming edges. However, composite parts, particularly large composite parts, may tend to deform once they are removed from a tool upon which they are cured. Such deformation may present challenges related to the accuracy of the machining operations. As such, post-machining operations, such as shimming, may be required due to differences between an as-built shape of the composite structure and a shape of the composite structure during machining. These challenges may also limit the capacity for determine assembly or predictive assembly of a manufactured structure that includes the composite part. Accordingly, those skilled in the art continue with research and development efforts in the field of composite manufacturing.

SUMMARY

Disclosed are examples of a system for post-cure processing of a composite workpiece, a tool for post-cure processing of a composite workpiece, and a method for post-cure processing of a composite workpiece. The following is a non-exhaustive list of examples, which may or may not be claimed, of the subject matter according to the present disclosure.

In an example, the disclosed system includes a tool. The tool includes a tool surface. The tool surface supports a composite workpiece located on the tool. The system also includes a drill template. The drill template defines a drilling location for drilling a hole through the composite workpiece while the composite workpiece is on the tool.

In an example, the disclosed tool includes a tool surface that supports a composite workpiece located on the tool. The tool also includes a recess formed in the tool surface. The tool further includes a sacrificial material within the recess and having a top surface that is substantially flush with the tool surface. A portion of a drill bit penetrates the recess, drilling the sacrificial material, when drilling a hole through the composite workpiece while the composite workpiece is on the tool.

In another example, the disclosed system includes a tool. The tool includes a tool surface that supports the composite workpiece located on the tool. The tool also includes a sacrificial portion disposed on the tool surface. The system also includes a drill template that defines a drilling location on the composite workpiece. The system further includes a drill that includes a drill bit for drilling a hole through the composite workpiece at the drilling location, defined by the drill template, while the composite workpiece is on the tool. A portion of the drill bit penetrates the sacrificial portion of the tool after the drill bit passes through the composite workpiece.

In another example, the disclosed method includes steps of: (1) supporting a composite workpiece on a tool surface of a tool; (2) defining a drilling location on the composite workpiece while the composite workpiece is on the tool using a drill template; and (3) drilling a hole through the composite workpiece at the drilling location, defined by the drill template, while the composite workpiece is on the tool.

Other examples of the disclosed system, tool, and method will become apparent from the following detailed description, the accompanying drawings, and the appended claims.

DETAILED DESCRIPTION

Referring generally to FIGS. 1-15, by way of examples, the present disclosure is directed to a system 100 for post-cure processing of a composite workpiece 102. The system 100 facilitates an initial operation in the post-cure processing, in which at least one machining operation is performed on the composite workpiece 102 while the composite workpiece 102 is on a tool 104 in its as-built shape. The system 100 advantageously improves the accuracy and precision of the machining operation, facilitates automated indexing of the composite workpiece 102 during subsequent machining or processing operations, and facilitates determinate or predictive assembly of a structure that includes the composite workpiece 102.

Figure 18:
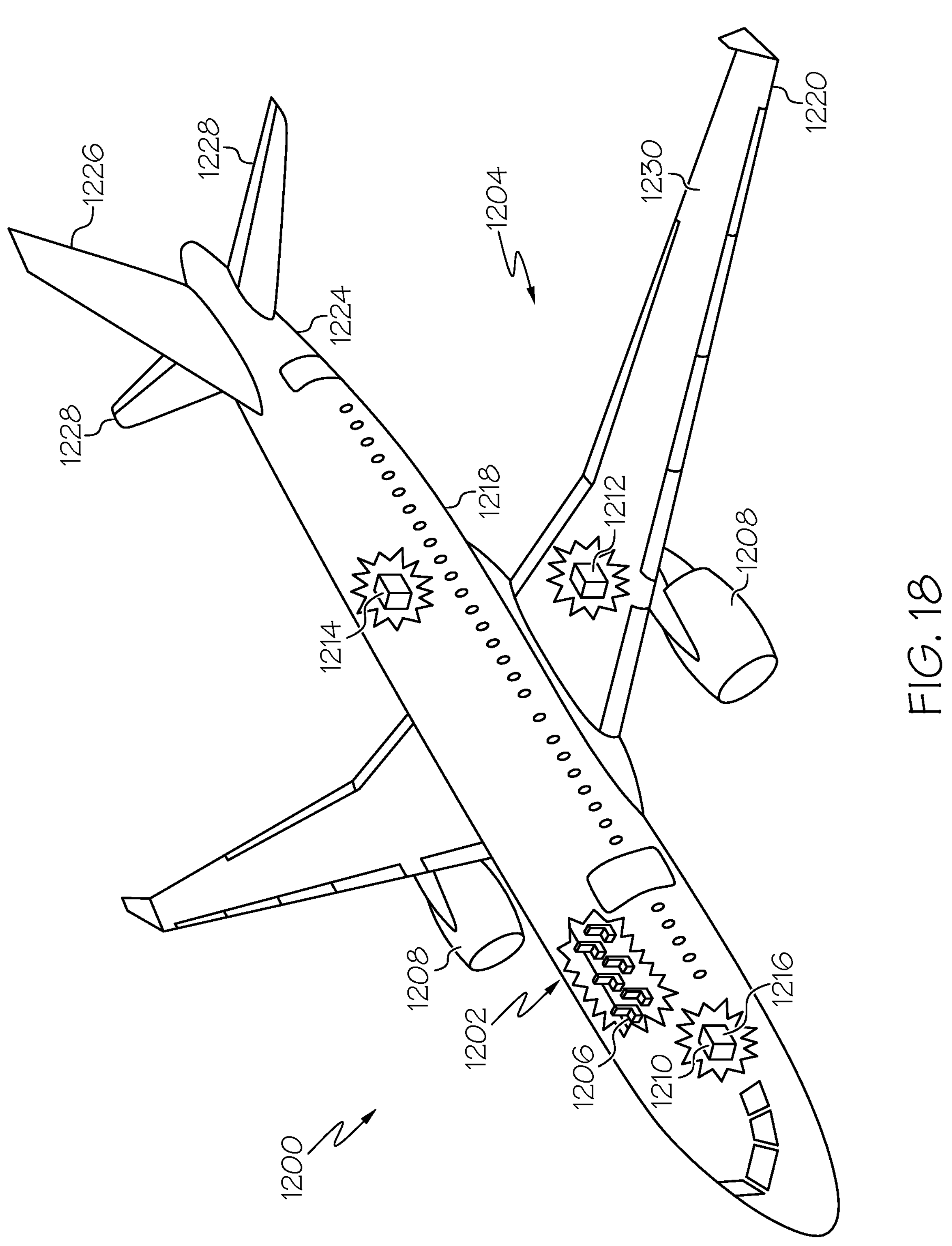
FIG. 18 is a schematic illustration of an example of an aircraft.

For the purpose of the present disclosure, the term "composite workpiece" (e.g., composite workpiece 102) refers to any object, article, item, or structure made of a cured composite material. In one or more examples, the composite workpiece 102 is, or forms, a part or a component of a larger manufactured article or structure, such as an aircraft or a component of an aircraft. As an example, the composite workpiece 102 is a wing panel 1230 of an aircraft 1200 (e.g., as shown in FIG. 18).

For the purpose of the present disclosure, the term "post-cure" refers to a condition of a composite material after a curing operation, such as by application of heat and/or pressure, to cure, anneal, dry, and/or harden the composite material.

For the purpose of the present disclosure, the term "as-built," such as in reference to the as-built condition or shape of the composite workpiece 102, refers to a condition of the composite workpiece 102 in which the composite workpiece 102 has a shape (e.g., geometry, profile, contour, and the like) as formed and/or cured on the tool 104.

It can be appreciated that once a composite structure (e.g., the composite workpiece 102) is removed from a cure tool upon which it is cured (e.g., tool 104), the composite structure may tend to deform (e.g., change shape), for example, due to residual stresses in the composite structure or due to external forces applied to the composite structure during post-cure processing. The principles and implementations of the system 100 disclosed herein enable a machining operation to be performed on the composite workpiece 102 while the composite workpiece 102 is on the tool 104. As such, the machining operation is performed on the composite workpiece 102 while the composite workpiece 102 is in the as-built condition or while having the as-built shape, thereby, reducing or eliminating inaccurate or inconsistent machining due to the machining operation being performed on a composite workpiece while the composite workpiece has a shape that is different than the as-built shape.

Additionally, the principles and implementations of the system 100 disclosed herein enable a digital model to be generated, which is representative of the composite workpiece 102 having the as-built shape. The digital model of the composite workpiece 102 in the as-built shape may be used to index the composite workpiece 102 before a subsequent processing operation is performed on the composite workpiece 102 from the tool 104. The digital model of the composite workpiece 102 may also be used to conform the composite workpiece 102 to the as-built shape during a subsequent processing operation performed on the composite workpiece 102 off the tool 104. As such, subsequent machining operations performed on the composite workpiece 102, with the composite workpiece 102 off the tool 104 but in the as-built shape, reduces or eliminates inaccurate or inconsistent machining due to the machining operation being performed on a composite workpiece while the composite workpiece has a shape that is different than the as-built shape.

Moreover, the principles and implementations of the system 100 disclosed herein enable the digital model to be updated after a machining operation is performed, such that the digital model is representative of an as-machined condition of the composite workpiece 102. For the purpose of the present disclosure, the term "as-machined," such as in reference to the as-machined condition the composite workpiece 102, refers to a condition of the composite workpiece 102 after a machining operation is performed on the composite workpiece 102. As such, the principles and implementations of the system 100 disclosed herein also enable determinate assembly or predictive assembly of the composite workpiece 102 based on the digital model of the composite workpiece 102, which is updated throughout post-cure processing of the composite workpiece 102.

Figure 1:
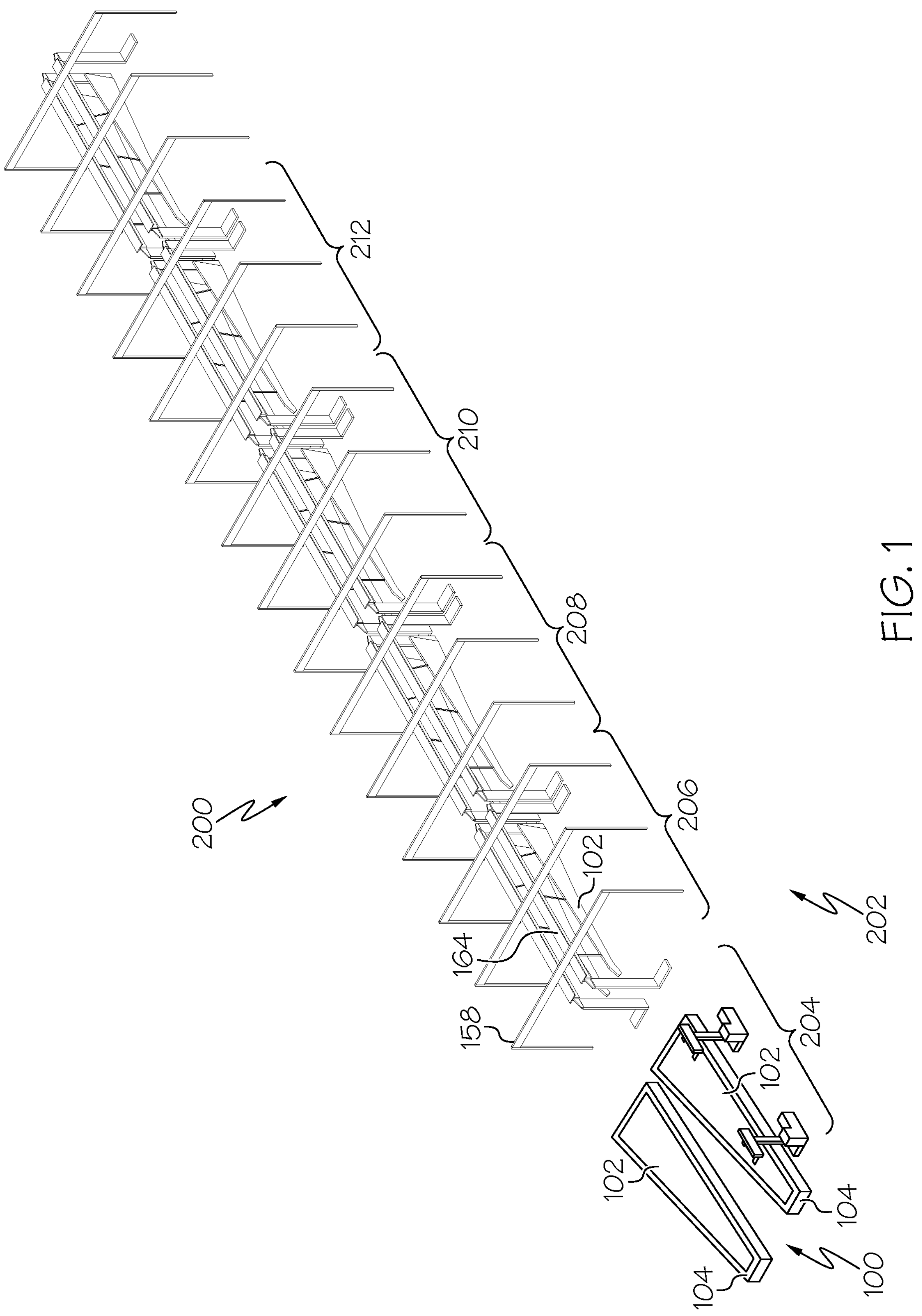
FIG. 1 is a schematic illustration of an example of a manufacturing environment for post-cure processing of a composite workpiece.

Referring now to FIG. 1, which schematically illustrates a manufacturing environment 200. The manufacturing environment 200 facilitates post-cure processing of the composite workpiece 102, such as machining, trimming, coating, painting, sub-assembly (e.g., assembly of other parts or components to the composite workpiece 102), and the like. Generally, the manufacturing environment 200 includes a plurality of work cells 202, identified individually as a first work cell 204, a second work cell 206, a third work cell 208, a fourth work cell 210, a fifth work cell 212, etc. Each one of the work cells 202 facilitates or corresponds to a different post-cure processing operation associated with the manufacture of the composite workpiece 102. In one or more examples, each one of the work cells 202 includes one or more systems, apparatuses, and/or machines that perform at least one post-cure processing operation. In one or more examples, the work cells 202 are interlinked (e.g., in series or parallel) and cooperate to automate at least a portion of the fabrication process.

The system 100 is associated with one of the work cells 202 and forms a sub-system of the manufacturing environment 200. In one or more examples, the system 100 is associated with the first work cell 204 and facilitates an initial post-cure processing operation performed on the composite workpiece 102. For example, after the composite workpiece 102 is cured (e.g., by a curing apparatus, such as an oven or autoclave), the composite workpiece 102 is transported to the first work cell 204 on the tool 104, upon which it was cured.

Figure 2:
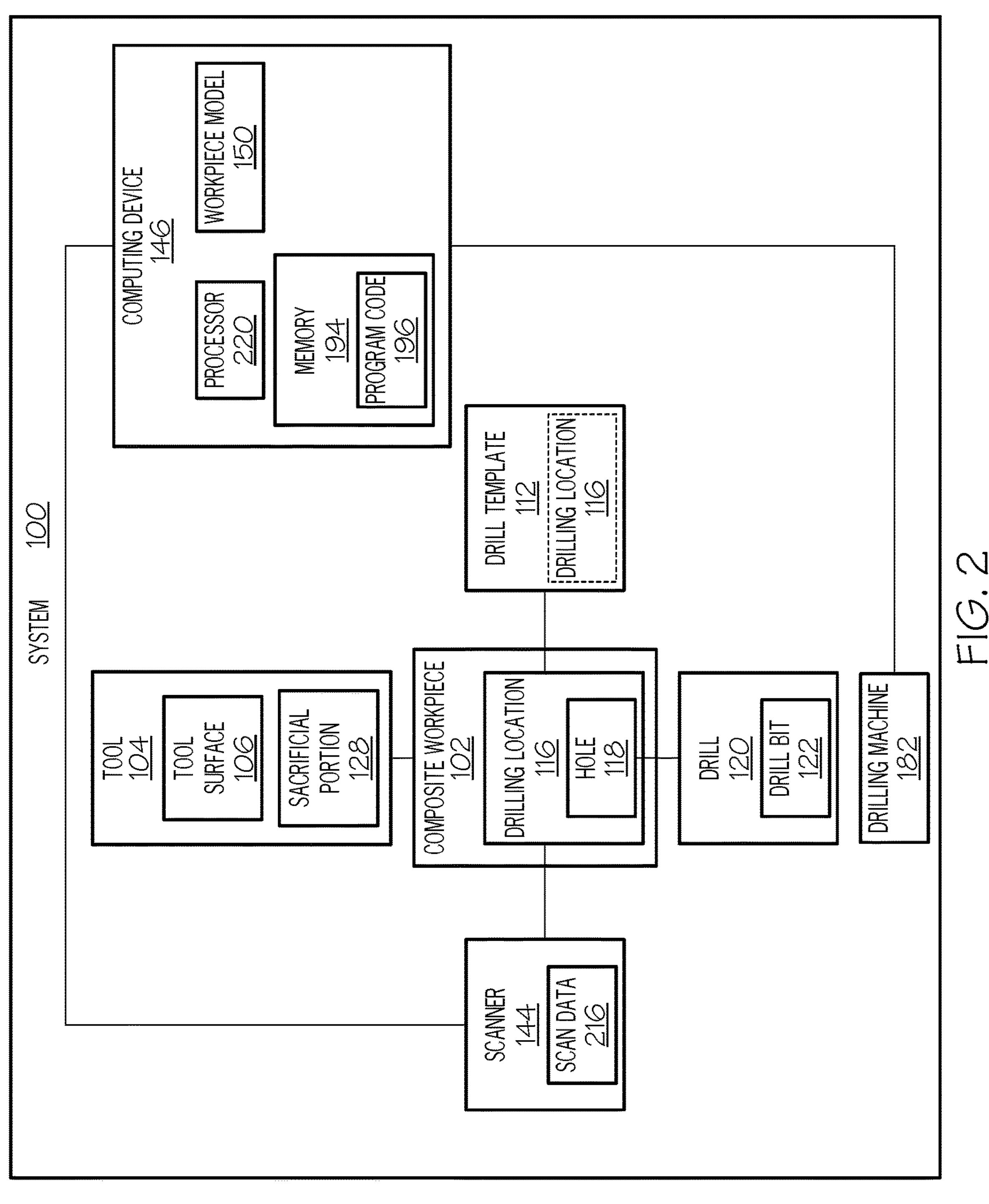
FIG. 2 is a schematic block diagram of an example of a system for post-cure processing of a composite workpiece.

Referring now to FIG. 2, which schematically illustrates an example of the system 100. In one or more examples, the system 100 includes the tool 104. The tool 104 includes a tool surface 106. The tool surface 106 supports the composite workpiece 102 located on the tool 104. The system 100 also includes a drill template 112. The drill template 112 defines a drilling location 116 for drilling a hole 118, such as a dependent-determinant assembly hole, through the composite workpiece 102 while the composite workpiece 102 is on the tool 104. Generally, the drilling location 116 is a desired location of the hole 118 to be drilled through the composite workpiece 102.

The drill template 112 enables the hole 118 to be drilled through the composite workpiece 102 at the drilling location 116, as desired or as predetermined based on manufacturing design, while the composite workpiece 102 is on the tool 104 and while in the as-built condition (e.g., having the as-built shape).

Figure 12:
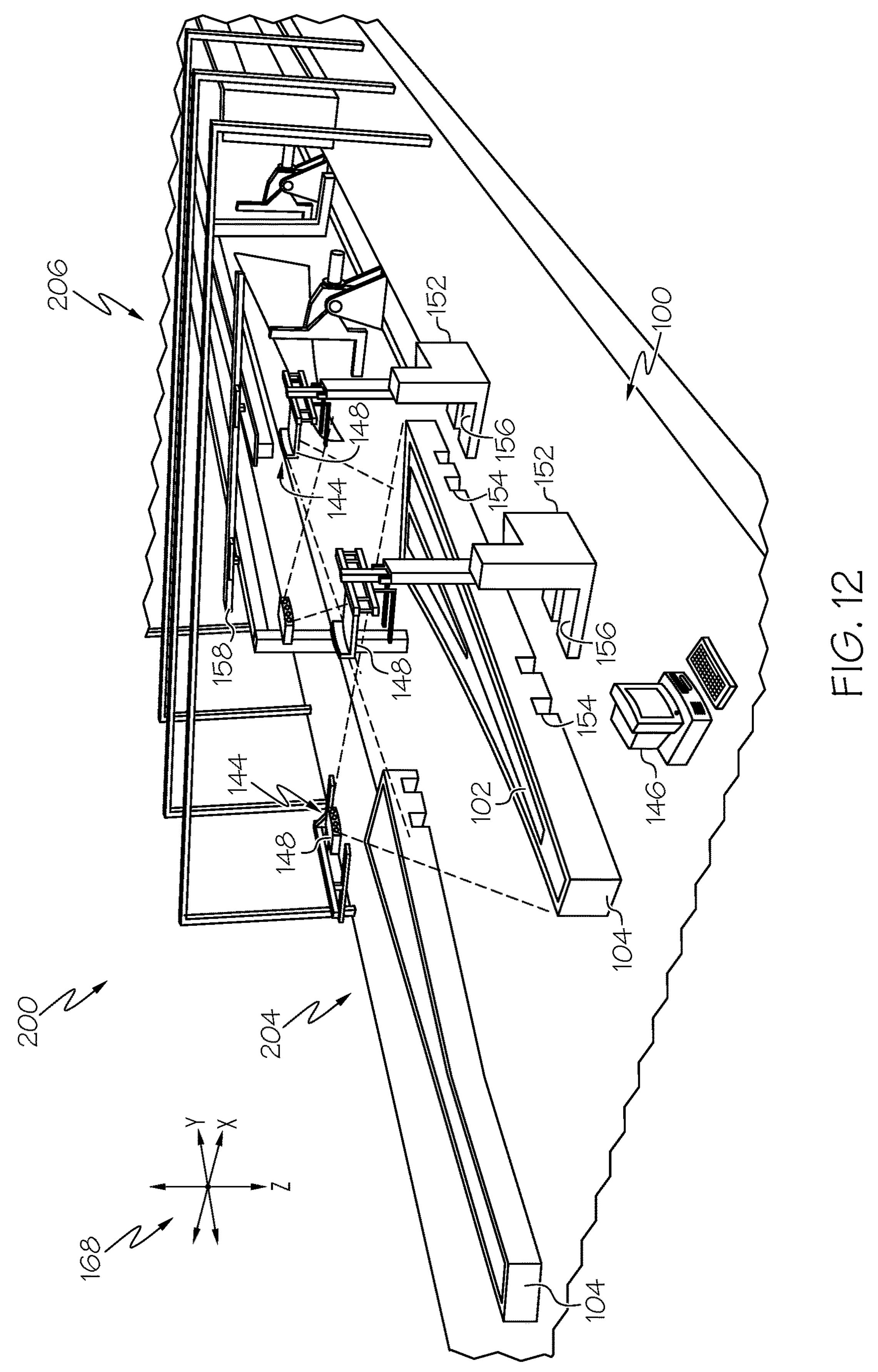
FIG. 12 is a schematic illustration of an example of a first work cell of the manufacturing environment, in which the hole is drilled through the composite workpiece while the composite workpiece is on the tool.
Figure 15:
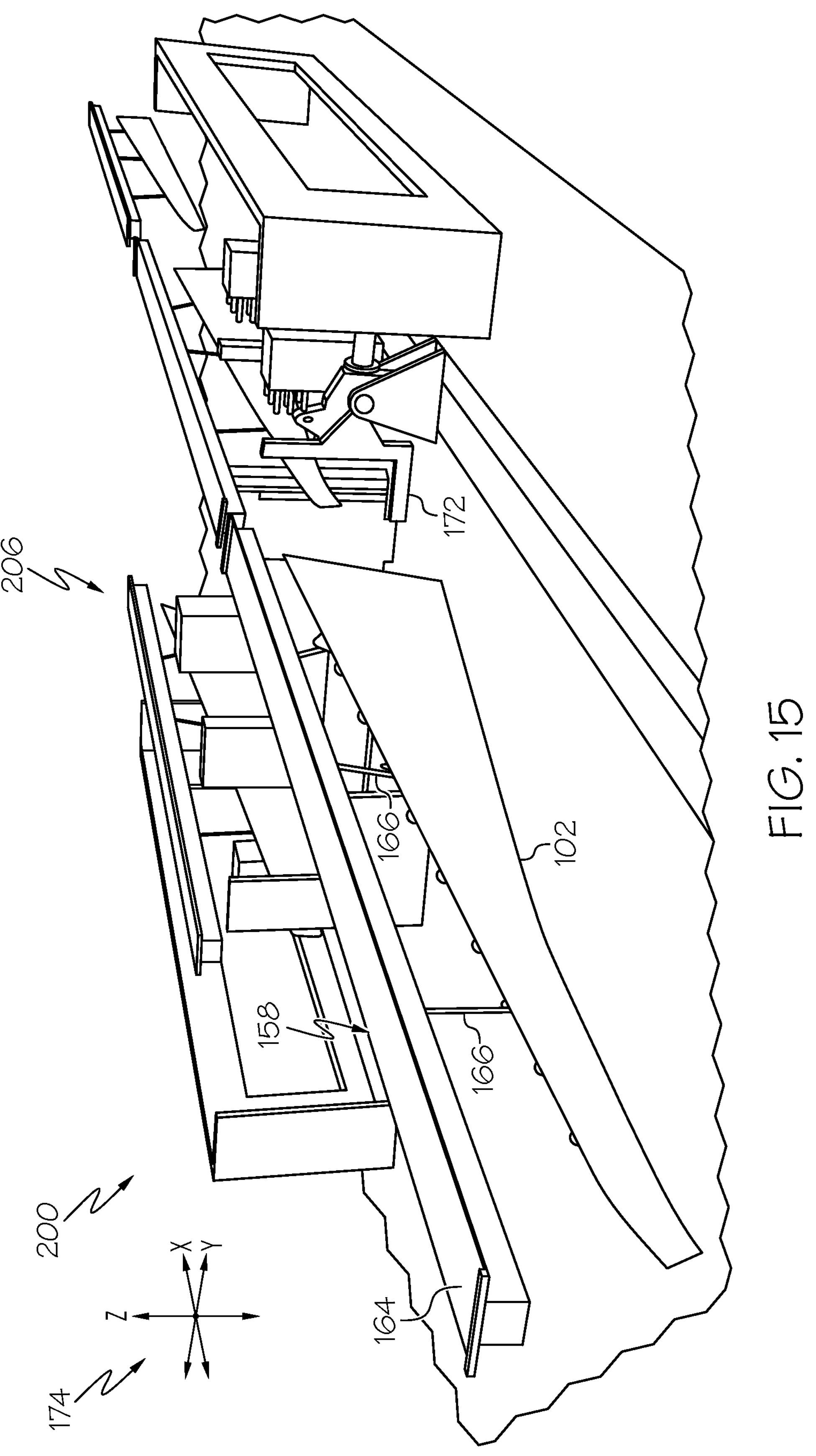
FIG. 15 is a schematic illustration of an example of a second work cell of the manufacturing environment, in which a subsequent processing operation is performed on the composite workpiece.

In one or more examples, the hole 118 is intended for use as, or serves as, any one of various types of holes. In one or more examples, the hole 118 is a determinate assembly hole that is used for a subsequent assembly operation to couple another component or structure to the composite workpiece 102 or to couple the composite workpiece 102 to another structure. In one or more examples, the hole 118 is used as an indexing feature for indexing the composite workpiece 102 in a subsequent one of the plurality of work cells 202 for performance of a subsequent post-cure processing operation. In one or more examples, the hole 118 is used as a carrying feature, such for attachment of the composite workpiece 102 to a material handler (e.g., an overhead material handler 158 as illustrated in FIGS. 12 and 15).

In one or more examples, the tool 104 includes a sacrificial portion 128. The sacrificial portion 128 of the tool 104 is disposed on, or forms a portion of, the tool surface 106. The drill template 112 indexes the drilling location 116 to the sacrificial portion 128 of the tool 104.

In one or more examples, the system 100 also includes a drill 120 to drill the hole 118 through the composite workpiece 102 at the drilling location 116, defined by the drill template 112, while the composite workpiece 102 is on the tool 104. The drill 120 includes a drill bit 122. The sacrificial portion 128 of the tool 104 receives (e.g., is penetrated by) a portion of the drill bit 122 after the drill bit 122 passes through the composite workpiece 102 when drilling the hole 118 through the composite workpiece 102. In other words, the sacrificial portion 128 defines a portion (e.g., a drill-penetration portion) of the tool 104 that is designed or that is intended to be drilled while the hole 118 is being drilled through the composite workpiece 102. For example, a portion of the drill bit 122 extends into the sacrificial portion 128 when drilling the hole 118 through the composite workpiece 102.

Figure 3:
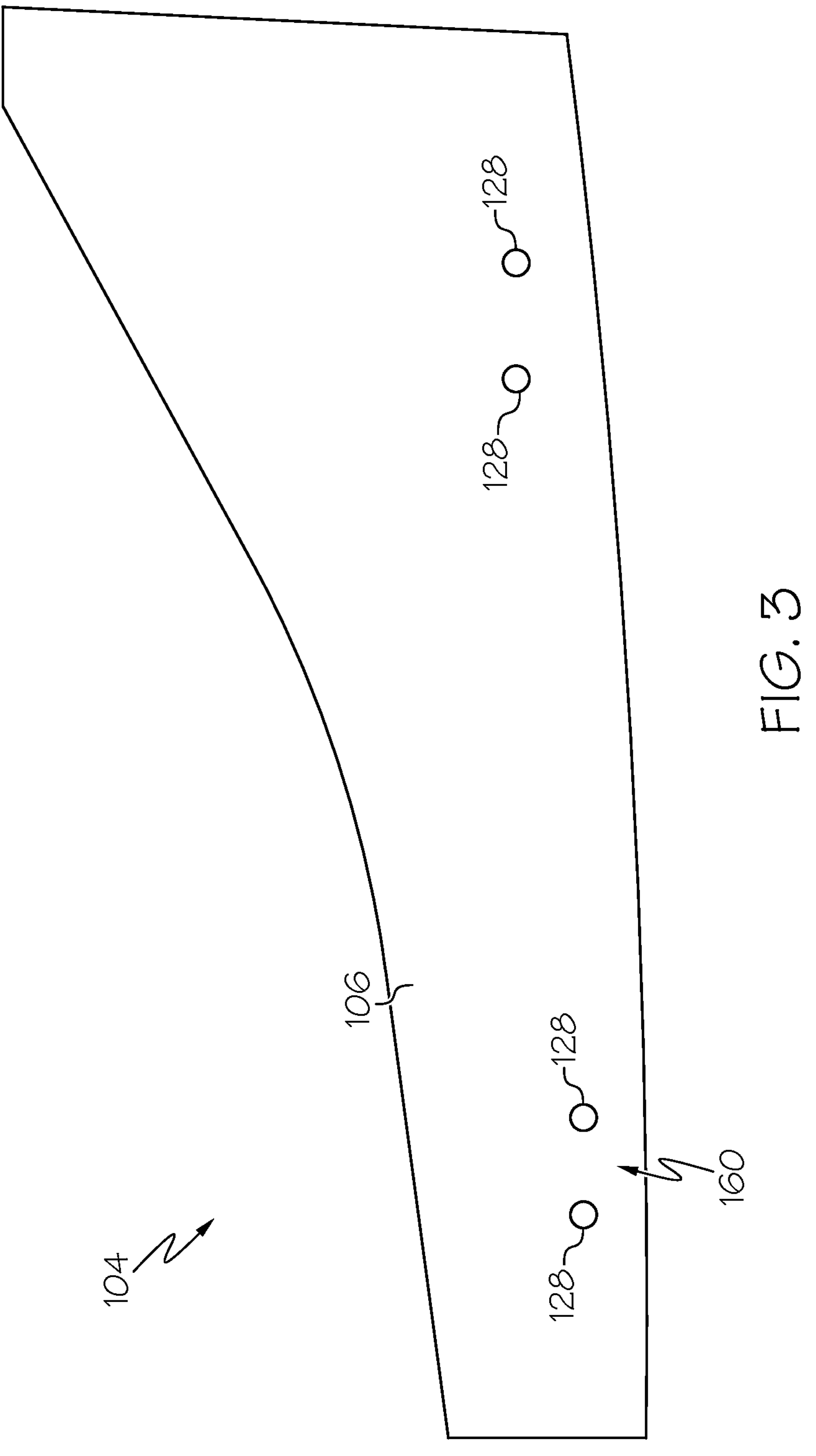
FIG. 3 is a schematic, top plan view of an example of a tool of the system.

Referring to FIG. 3, which schematically illustrates an example of the tool 104. Generally, the sacrificial portion 128 is formed in, is disposed on, or otherwise forms a portion of the tool surface 106. In one or more examples, the tool 104 includes a plurality of sacrificial portions 160. The sacrificial portion 128 (e.g., any one of a plurality of sacrificial portions 160) may be located at any suitable location on the tool surface 106. Generally, the sacrificial portion 128 corresponds to a desired location of the hole 118 to be drilled through the composite workpiece 102.

Figure 4:
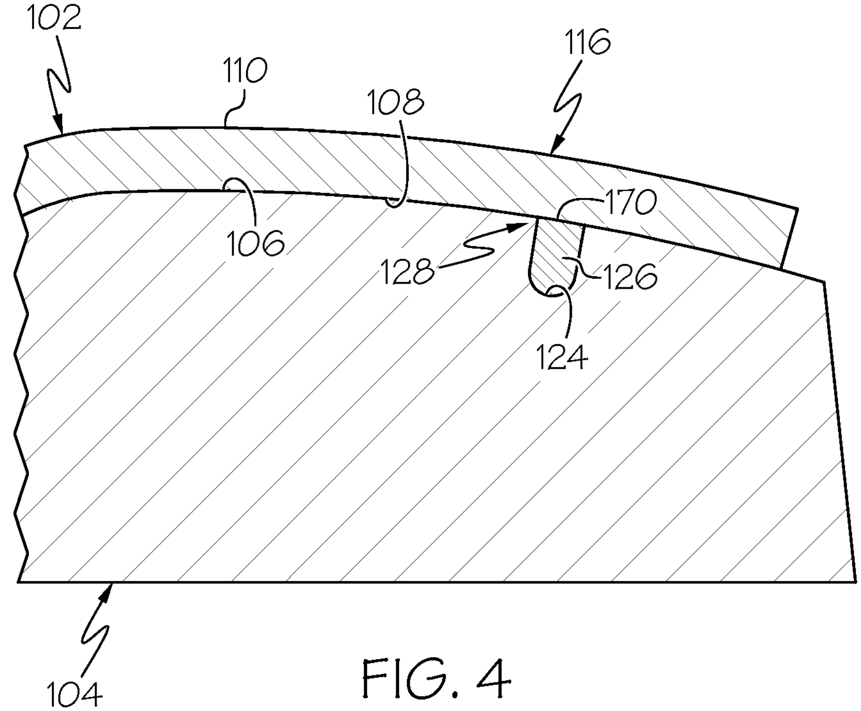
FIG. 4 is a schematic, sectional view of an example of a portion of the tool and the composite workpiece on the tool.

The sacrificial portion 128 may have any geometry and/or dimensions suitable to receive, or to be penetrated by, a portion of the drill bit 122 when drilling the hole 118 through the composite workpiece 102. For example, the sacrificial portion 128 includes a two-dimensional geometry in plan view (e.g., as shown in FIG. 3) and a two-dimensional geometry in section view (e.g., as shown in FIG. 4). The two-dimensional geometry of the sacrificial portion 128 in plan view defines a width dimension and length dimension of the sacrificial portion 128. The two-dimensional geometry of the sacrificial portion 128 in section view defines a depth dimension of the sacrificial portion 128.

The illustrative examples show the sacrificial portion 128 as being configured to receive a portion of the drill bit 122 during a drilling operation, for example, as having a circular shape in plan view and approximately rectangular shape in section view. However, the principles and implementation of the sacrificial portion 128 may be applied to other machining operations performed on the composite workpiece 102, while on the tool 104, by other types of machining tools. For example, the sacrificial portion 128 may have an elongate (e.g., long and narrow) rectangular shape in plan view and be configured to receive a router bit or cutting blade during a milling, cutting, or trimming operation. Alternatively, in one or more examples, the sacrificial portion 128 may have the elongate rectangular shape in plan view and be configured to receive a portion of the drill bit 122 during a drilling operation. In these examples, the desired location of the hole 118 to be drilled through the composite workpiece 102 (e.g., the drilling location 116) is located along the sacrificial portion 128.

Referring to FIG. 4, which schematically illustrates an example of a portion of the tool 104 and a portion of the composite workpiece 102 on the tool 104 before the hole 118 is drilled through the composite workpiece 102. In one or more examples, the sacrificial portion 128 of the tool 104 includes a recess 124 formed in the tool surface 106, for example, formed in the tool 104 and depending from the tool surface 106. The sacrificial portion 128 also includes a sacrificial material 126 located within the recess 124. The sacrificial material 126 includes, or forms, a top surface 170 of the sacrificial portion 128. The top surface 170 of the sacrificial portion 128 is substantially flush with, or forms a portion of, the tool surface 106. In one or more examples, a portion of the drill bit 122 penetrates the recess 124, drilling the sacrificial material 126, when drilling the hole 118 through the composite workpiece 102, according to the drill template 112, while the composite workpiece 102 is on the tool 104.

The sacrificial material 126 includes, or is made from, any material suitable for application within the recess 124 and for use as a curing surface for a composite layup that is cured on the tool 104. For example, the sacrificial material 126 fills the recess 124 and hardens such that the top surface 170 of the sacrificial portion 128 is compatible with and forms a portion of the tool surface 106. In one or more examples, the sacrificial material 126 is a potting compound. However, any one of various other types of materials may be used for the sacrificial material 126.

As illustrated in FIG. 4, the composite workpiece 102 includes a first surface 108 and a second surface 110, which is opposite the first surface 108. In one or more examples, the first surface 108 defines an outer mold line of the composite workpiece 102 and the second surface 110 defines an inner mold line of the composite workpiece 102. In one or more examples, the first surface 108 defines the inner mold line of the composite workpiece 102 and the second surface 110 defines the outer mold line of the composite workpiece 102.

The tool surface 106 supports, or is in contact with, the first surface 108 of the composite workpiece 102. Additionally, the top surface 170 of the sacrificial portion 128 is in contact with a portion of the first surface 108 of the composite workpiece 102. The drilling location 116 (e.g., the desired location for the hole 118 to be drilled through the composite workpiece 102) is located over the sacrificial portion 128 of the tool 104.

Figure 5:
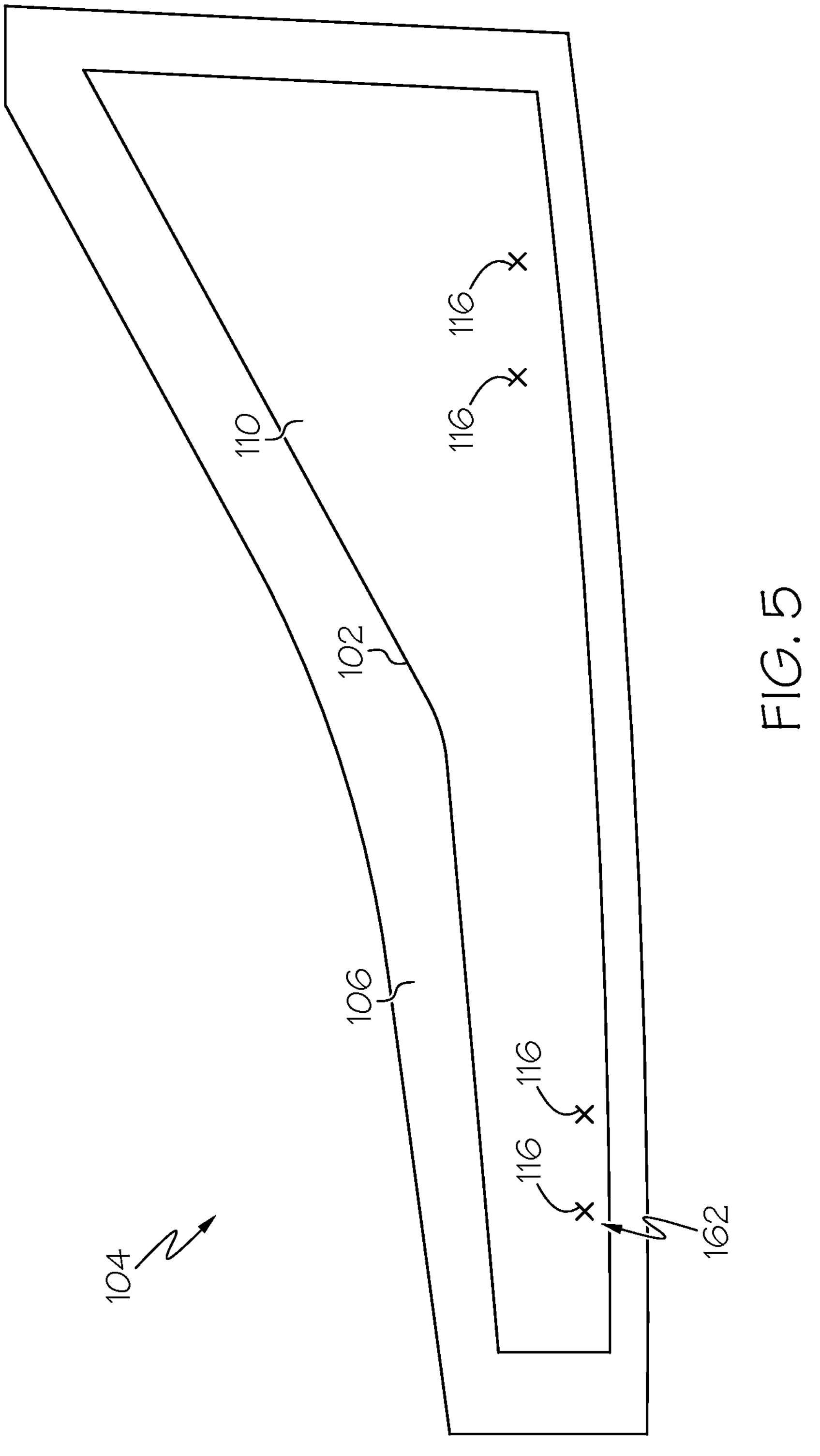
FIG. 5 is a schematic, top plan view of an example of the tool and the composite workpiece on the tool.

Referring now to FIG. 5, which schematically illustrates an example of the tool 104 and the composite workpiece 102 on the tool 104 before the hole 118 is drilled through the composite workpiece 102. Generally, the composite workpiece 102 is fabricated from a composite layup (e.g., a composite laminate or composite preform) that is cured on the tool 104. As such, in one or more examples, in addition to the tool 104 serving as a support structure for machining the composite workpiece 102, the tool 104 also serves as a cure tool and the tool surface 106 serves as a cure surface that supports the composite layup during cure.

Generally, the composite layup includes a plurality of plies (e.g., layers) of a composite material. Each ply of composite material may take the form of a composite sheet or a series of lengths of composite tape. The composite material includes a reinforcement material (e.g., carbon fiber, glass fiber, aramid fiber, and the like) that is embedded in a matrix binding material (e.g., a polymeric matrix, a thermoset plastic, a thermoplastic, a resin, and the like).

In one or more examples, the composite layup is formed on the tool 104. As such, in one or more examples, the tool 104 also serves as a layup tool or mandrel and the tool surface 106 serves as a layup surface that supports the composite layup during fabrication and that shapes the composite layup. However, in other examples, the composite layup may be fabricated on a dedicated layup tool and transferred to the tool 104 for cure and subsequent machining on the tool 104 after cure.

As illustrated in FIG. 5, in one or more examples, the composite workpiece 102 includes a plurality of drilling locations 162. The drilling location 116 (e.g., any one of the plurality of drilling locations 162) may be located at any suitable location on the composite workpiece 102, as defined by the drill template 112. The drilling location 116 (e.g., any one of the plurality of drilling locations 162) is aligned with or indexed to the sacrificial portion 128 (e.g., a corresponding one of the plurality of sacrificial portions 160) of the tool 104.

Figure 6:
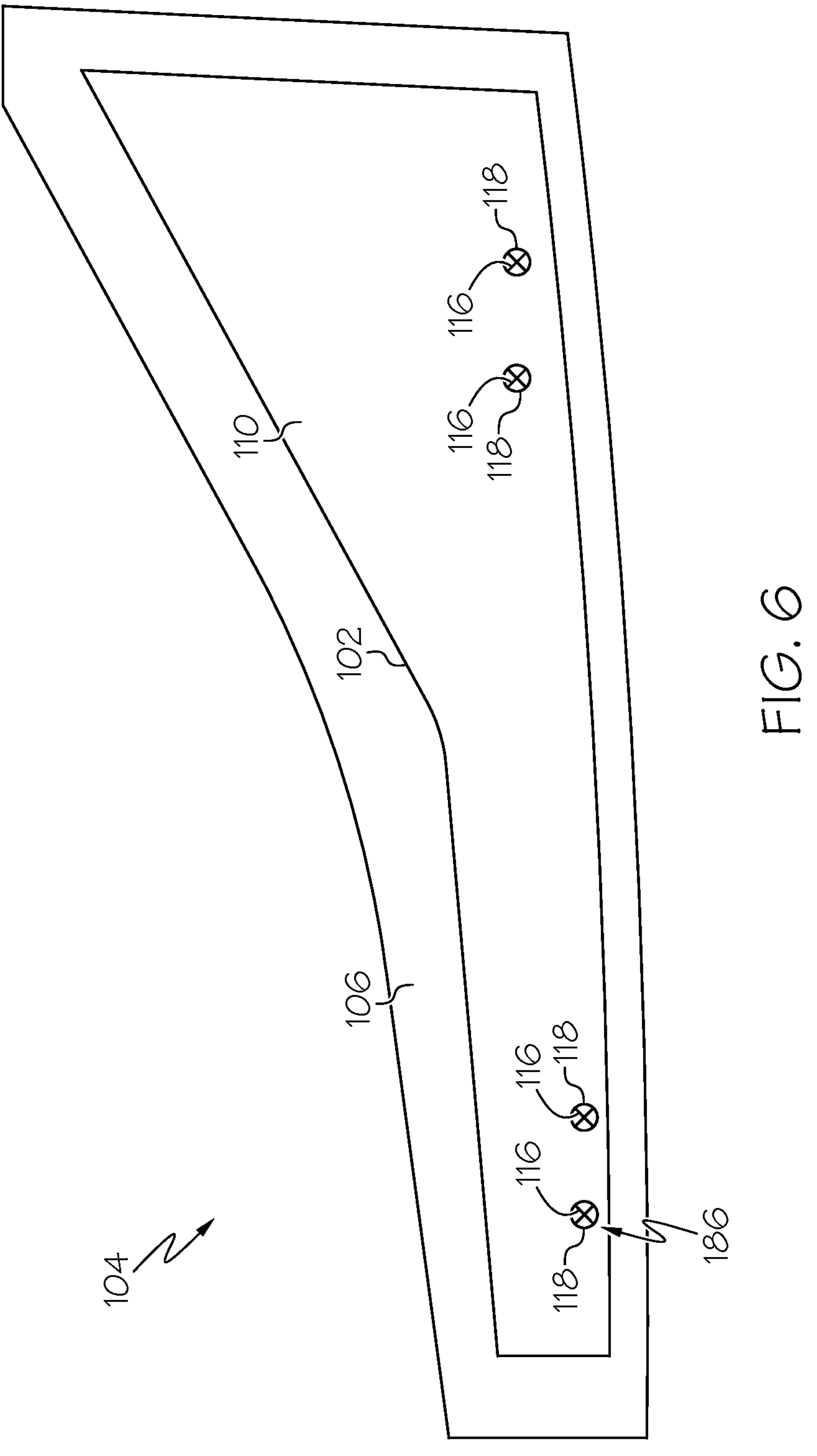
FIG. 6 is a schematic, top plan view of an example of the tool and the composite workpiece on the tool after a hole is drilled through the composite workpiece on the tool.

Referring now to FIG. 6, which schematically illustrates an example of the tool 104 and the composite workpiece 102 on the tool 104 after the hole 118 is drilled through the composite workpiece 102. In one or more examples, the composite workpiece 102 includes a plurality of holes 186. The hole 118 (e.g., any one of the plurality of holes 186) is located at any suitable location on the composite workpiece 102 according to the drilling location 116 (e.g., a corresponding one of the plurality of drilling locations 162) defined by the drill template 112.

Figure 7:
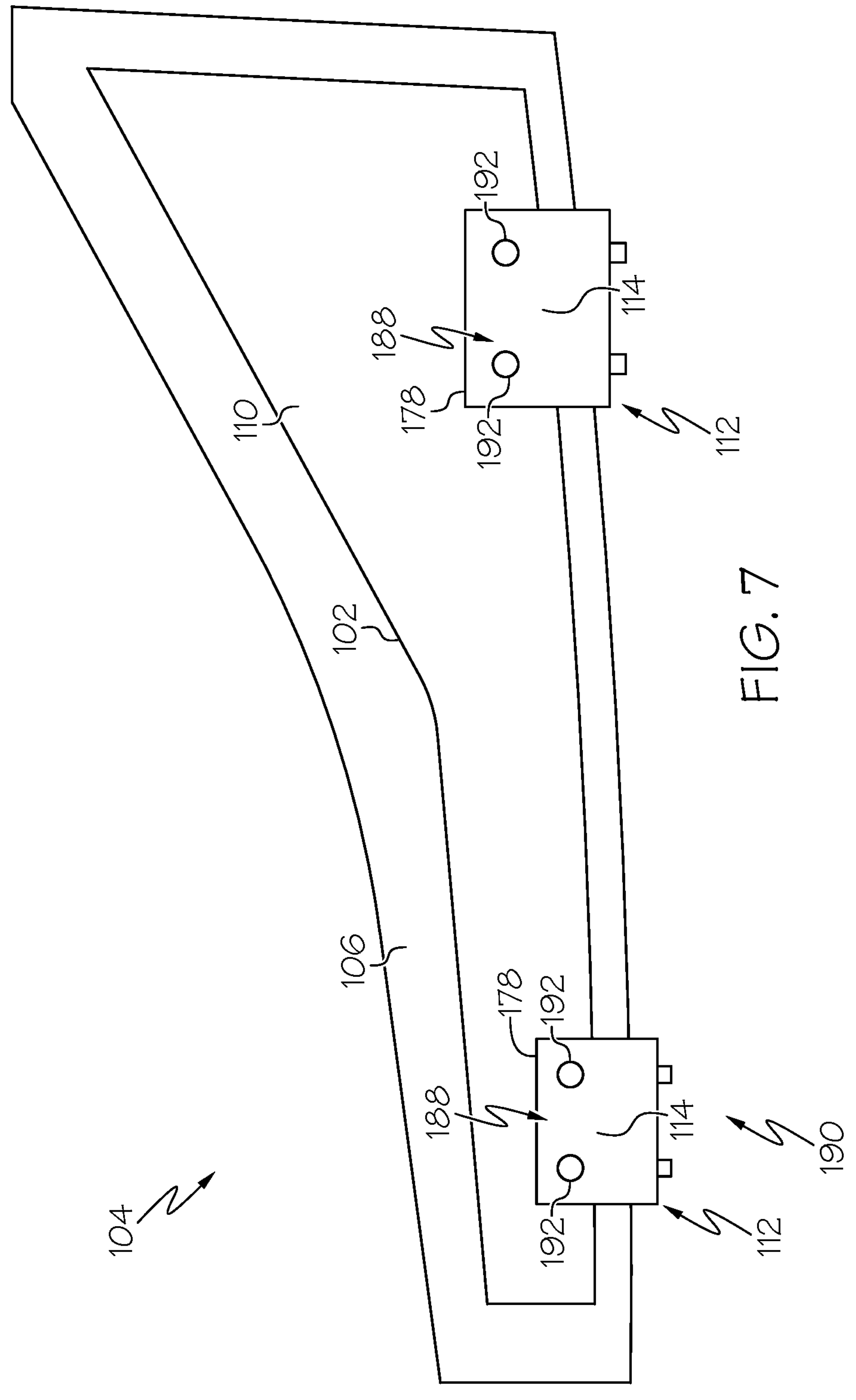
FIG. 7 is a schematic, top plan view of an example of the tool, the composite workpiece on the tool, and a drill template.

Referring now to FIGS. 7, which schematically illustrates an example of the tool 104, the composite workpiece 102 on the tool 104, and the drill template 112 used to locate the drilling location 116 relative to the composite workpiece 102. In one or more examples, the drill template 112 is a physical template, which is coupled to the tool 104. In one or more examples, the drill template 112 includes a template body 178. The template body 178 is coupled to the tool 104. The drill template 112 also includes a drill guide 114 formed in the template body 178. The drill guide 114 defines, or locates, the drilling location 116 relative to the composite workpiece 102. For example, the drill guide 114 locates a drilling axis of the drill bit 122 relative to the composite workpiece 102. With the drill template 112 coupled to the tool 104, the template body 178 is indexed relative to the tool 104. The template body 178 thereby indexes the drill guide 114 relative to the composite workpiece 102 and relative to the tool 104 such that the drilling location 116 is aligned with the sacrificial portion 128 of the tool 104.

In one or more examples, the drill guide 114 includes, or is formed by, a template hole 192. The template hole 192 is formed, or extends, through the template body 178. The drill guide 114 (e.g., the template hole 192) receives and guides the drill bit 122 when drilling the hole 118 through the composite workpiece 102 on the tool 104.

In one or more examples, the template body 178 locates the drill guide 114 (e.g., the template hole 192) relative to the second surface 110 of the composite workpiece 102. With the drill template 112 coupled to the tool 104, the template body 178 indexes the drill guide 114 (e.g., the template hole 192) relative to the tool 104 and to the composite workpiece 102 such that the drilling location 116 is at the desired location on the composite workpiece 102 and is aligned with the sacrificial portion 128 of the tool 104.

In one or more examples, the drill guide 114 includes a plurality of template holes 188. Each one of the plurality of template holes 188 corresponds to, or defines, a corresponding one of the plurality of drilling locations 162. Each one of the plurality of template holes 188 is indexed to or is aligned with a corresponding one of the plurality of sacrificial portions 160 of the tool 104.

In one or more examples, the system 100 includes a plurality of drill templates 190. In one or more examples, each one of the plurality of drill templates 190 is coupled to the tool 104. Each one of the plurality of drill templates 190 is designed or configured to index the drill guide 114 to a corresponding one of the plurality of sacrificial portions 160, for example, based on the design and/or geometry of the tool 104 and/or of the composite workpiece 102.

Figure 8:
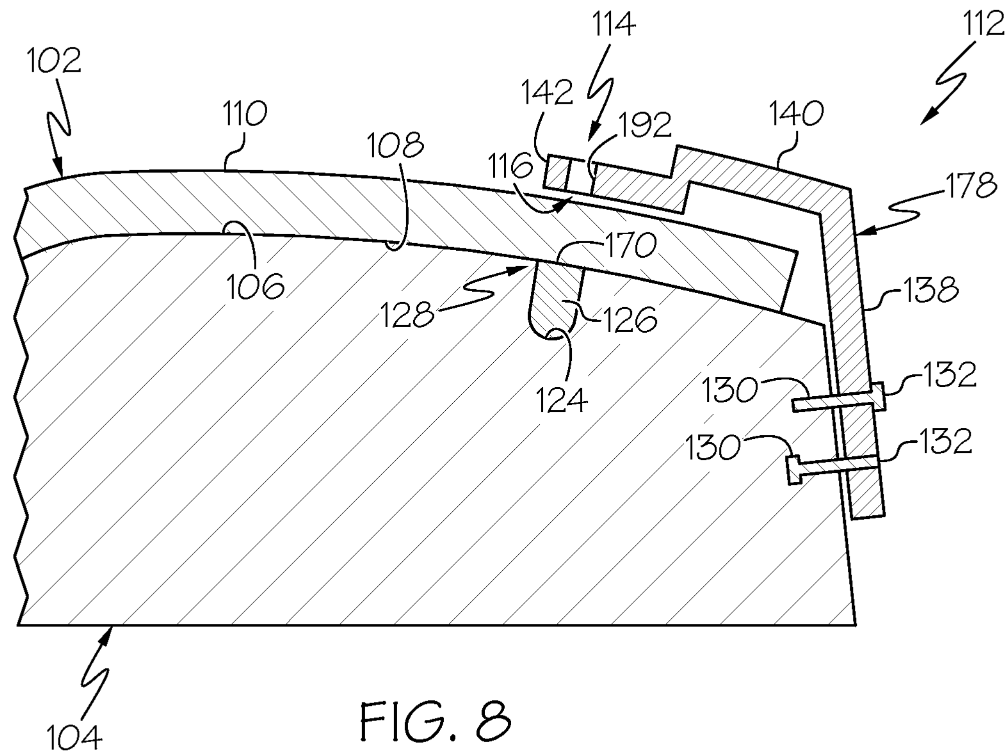
FIG. 8 is a schematic, sectional view of an example of a portion of the tool, the composite workpiece on the tool, and the drill template.

Referring now to FIG. 8, which schematically illustrates an example of a portion of the tool 104, a portion of the composite workpiece 102 on the tool 104, and the drill template 112 coupled to the tool 104 and used to locate the drilling location 116 relative to the composite workpiece 102. In one or more examples, the drill template 112 is indexed relative to the tool 104 such that the drill guide 114 is aligned with (e.g., over) the sacrificial portion 128 of the tool 104. Indexing the drill template 112 enables the drill template 112 to be repeatably and consistently used with the tool 104 to locate the drill guide 114 over the sacrificial portion 128 of the tool 104.

In one or more examples, the tool 104 includes a first template-indexing feature 130. The drill template 112 includes a second template-indexing feature 132. The second template-indexing feature 132 mates with the first template-indexing feature 130 to index the drill template 112 relative to the tool 104 and to index the drill guide 114 relative to the tool 104 and to the composite workpiece 102 at the drilling location 116. For example, the mating of the first template-indexing feature 130 and the second template-indexing feature 132 locates the template hole 192 adjacent to the second surface 110 of the composite workpiece 102 and aligns the template hole 192 with the sacrificial portion 128 of the tool 104.

In one or more examples, one of the first template-indexing feature 130 or the second template-indexing feature 132 is a male feature and the other one of the first template-indexing feature 130 or the second template-indexing feature 132 is a female feature that receives and mates with the male feature. For example, one of the first template-indexing feature 130 or the second template-indexing feature 132 is a pin, protrusion, or other projection and the other one of the first template-indexing feature 130 or the second template-indexing feature 132 is an aperture, recess, or other opening.

In one or more examples, the drill template 112 is coupled to the tool 104 using the first template-indexing feature 130 and the second template-indexing feature 132. In one or more examples, one of the first template-indexing feature 130 or the second template-indexing feature 132 is first component of a mechanical fastener, such as a threaded bolt, and the other one of the first template-indexing feature 130 or the second template-indexing feature 132 is a second component of the mechanical fastener, such as a nut or internally threaded aperture.

Figure 9:
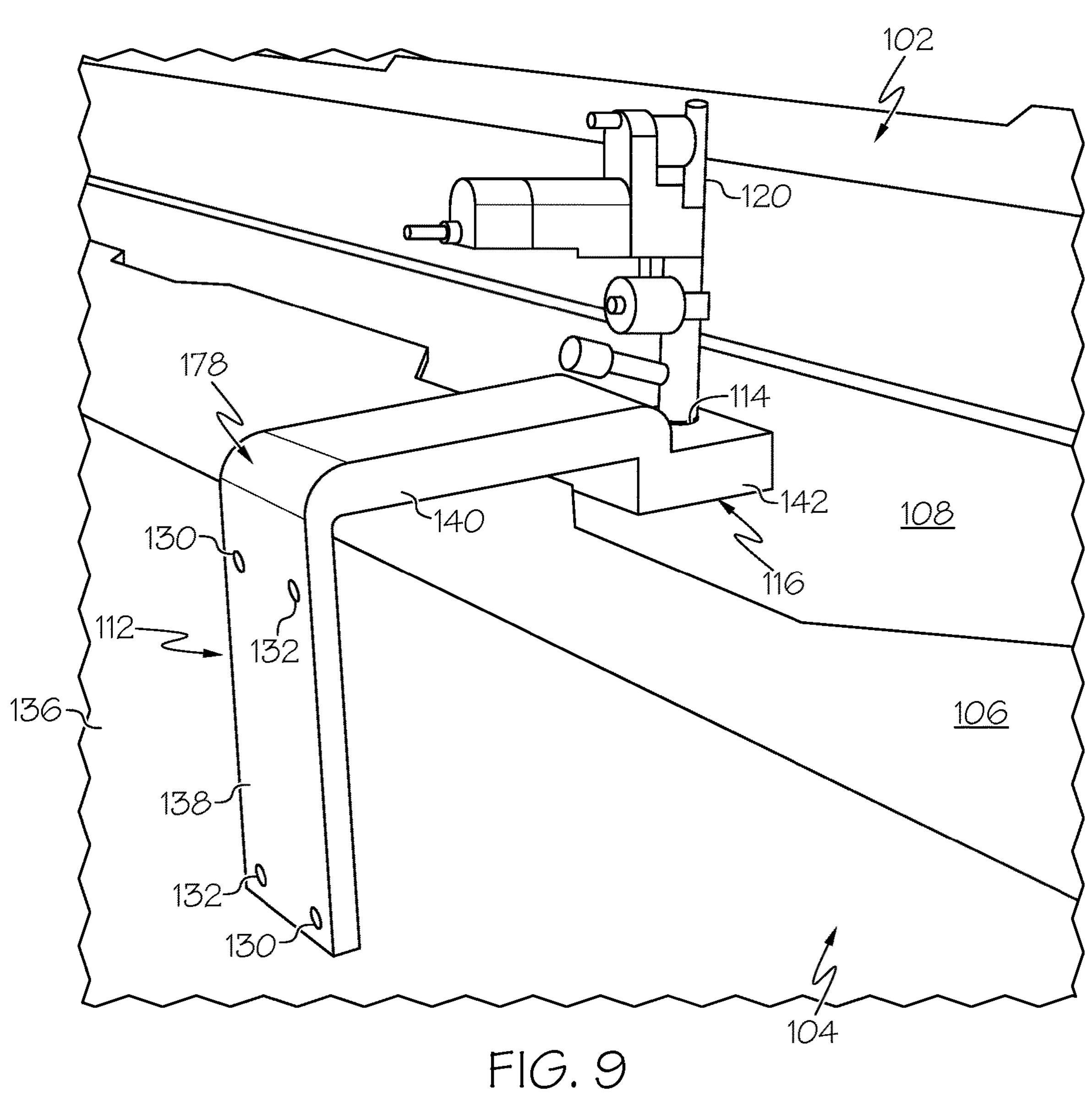
FIG. 9 is a schematic, perspective view of an example of a portion of the tool, the composite workpiece on the tool, and the drill template.
Figure 10:
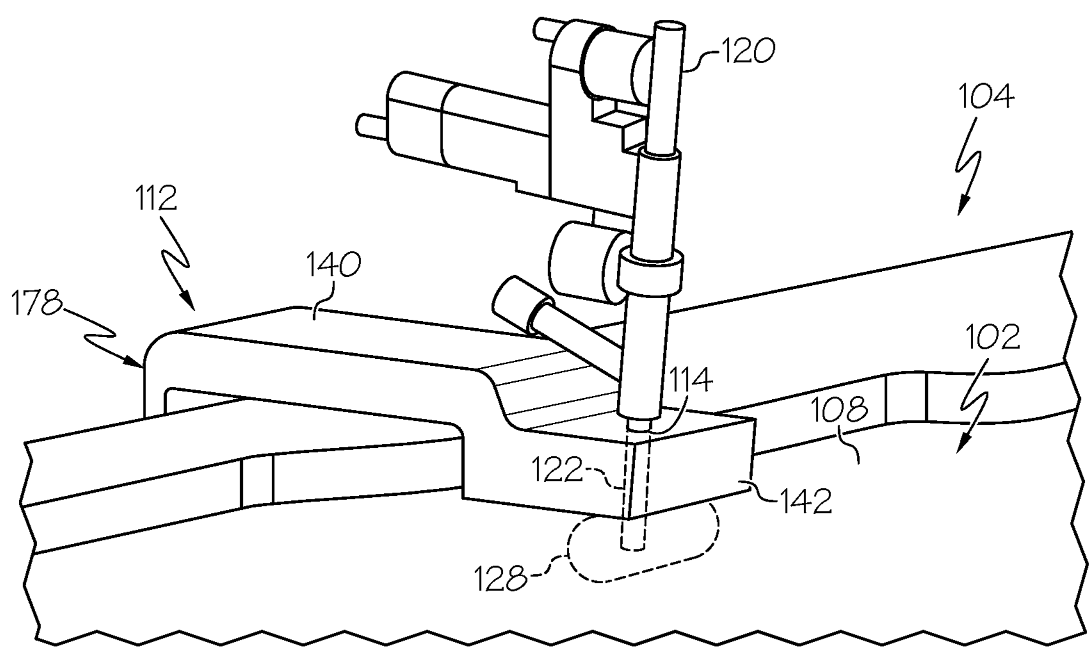
FIG. 10 is a schematic, perspective view of an example of a portion of the tool, the composite workpiece on the tool, and the drill template.

Referring now to FIGS. 9 and 10, which schematically illustrate examples of a portion of the tool 104, a portion of the composite workpiece 102 on the tool 104, and the drill template 112 used to locate the drilling location 116 relative to the composite workpiece 102. In one or more examples, the tool 104 also includes a side surface 136. The side surface 136 extends from the tool surface 106. In one or more examples, the drill template 112 is coupled to the side surface 136 and extends over the second surface 110 of the composite workpiece 102 while the composite workpiece 102 is on the tool 104. For example, the template body 178 is coupled to the side surface 136 of the tool 104 and extends over the second surface 110 of the composite workpiece 102 to locate the drill guide 114 over the sacrificial portion 128 of the tool 104.

In one or more examples, the template body 178 of the drill template 112 includes a first template-portion 138, a second template-portion 140, and a third template-portion 142. The first template-portion 138 is coupled to the tool 104, such as to the side surface 136 of the tool 104. The second template-portion 140 extends approximately perpendicular from the first template-portion 138. The third template-portion 142 extends from the second template-portion 140. The second template-portion 140 is located over the second surface 110 of the composite workpiece 102 while the composite workpiece 102 is on the tool 104. The third template-portion 142 is located proximate to the second surface 110 of the composite workpiece 102 while the composite workpiece 102 is on the tool 104. The drill guide 114 is formed by, or forms a portion of, the third template-portion 142. In an example, the template hole 192 is formed through the third template-portion 142.

Figure 11:
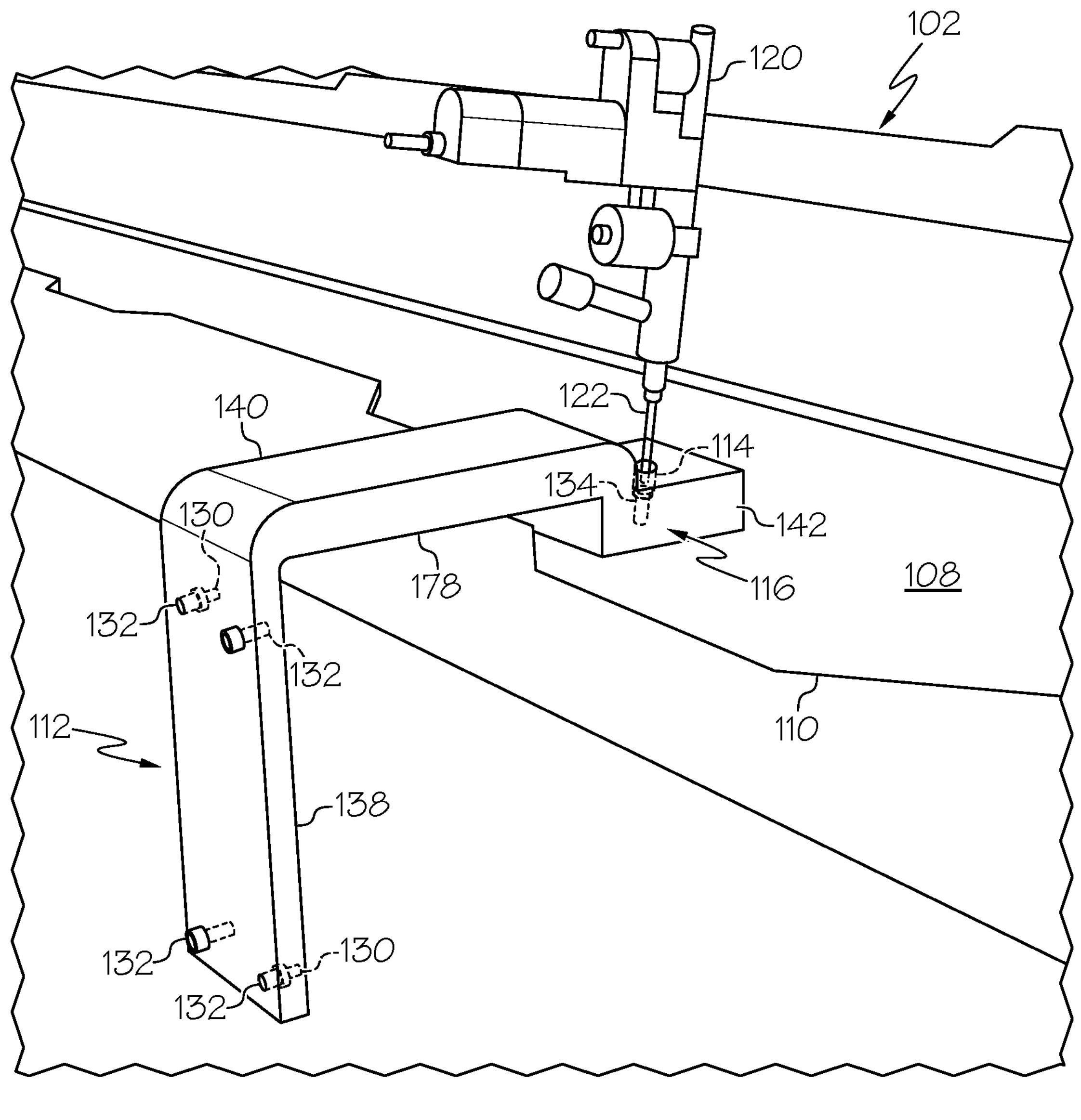
FIG. 11 is a schematic, perspective view of an example of a portion of the composite workpiece on the tool, the drill template, and a drill for drilling the hole through the composite workpiece.

Referring now to FIG. 11, which schematically illustrates an example of a portion of the composite workpiece 102, the drill template 112, and the drill 120. In one or more examples, the drill guide 114 of the drill template 112 includes a drill bushing 134. The drill bushing 134 forms, or is located in, the template hole 192. In an example, the drill bushing 134 is coupled to the third template-portion 142. The drill bushing 134 receives a portion of the drill bit 122 and guides the drill bit 122 when drilling the hole 118 through the composite workpiece 102 while the composite workpiece 102 is on the tool 104.

Referring now to FIG. 12, which schematically illustrates an example of the system 100 and the first work cell 204 to which the system 100 is associated. In one or more examples, the system 100 includes a scanner 144. The scanner 144 scans and digitizes at least a portion of the composite workpiece 102 while the composite workpiece 102 is on the tool 104. In one or more examples, the scanner 144 scans and digitizes at least the second surface 110 of the composite workpiece 102 while the composite workpiece 102 is on the tool 104.

The scanner 144 is any one of various types of three-dimensional (3D) scanners. In one or more examples, the scanner 144 includes, or is, a photogrammetric scanner 148 (e.g., as shown in FIG. 11), such as a photogrammetric camera. In other examples, the scanner 144 includes, or is, one of a laser triangulation scanner, a structured light scanner, other laser-based scanners or metrology systems, and the like.

The scanner 144 captures the geometry (e.g., size and shape), contour (e.g., curvature), physical features (e.g., holes, edges, etc.), and other details of the composite workpiece 102. Scan data 216 generated the scanner 144 is used by a computer to form a workpiece model 150. The workpiece model 150 is a digital three-dimensional representation of the composite workpiece 102.

Referring to FIGS. 2 and 12, in one or more examples, the system 100 also includes a computing device 146. The computing device 146 is adapted to generate and/or manipulate the workpiece model 150 based on the scan data 216 generated by the scanner. The workpiece model 150 is representative of at least a portion of the composite workpiece 102 in the as-built shape.

The computing device 146 may include a single computer or several interconnected computers. For example, the computing device 146 may include any collection of computing devices that individually or jointly execute a set (or multiple sets) of instructions to implement any one or more of the operations discussed herein. The computing device 146 includes a processor 220 (e.g., at least one processing unit) that is coupled to memory 194. The memory 194 includes program code 196 that is executable by the processor 220 to perform one or more operations. Generally, as used herein, the phrase "the computing device 146 is adapted to" refers to the computing device 146 being configured or otherwise operable to perform a function, such as the program code 196 being executed by the processor 220 to perform a desired operation or function. The program code 196 is any coded instructions that is (e.g., computer readable and/or machine readable. The memory 194 is any a non-transitory computer readable and/or machine readable medium, such as a hard disk drive, flash memory, read-only memory, a compact disk, a digital versatile disk, a cache, random-access memory, and/or any other storage device or storage disk in which information is stored for any duration (e.g., for extended time periods, permanently, for brief instances, for temporarily buffering, and/or for caching of the information).

In one or more examples, the workpiece model 150 is representative of the geometry of the second surface 110 of the composite workpiece 102 as on the tool 104 (e.g., with the composite workpiece 102 having the as-built shape). For example, the workpiece model 150 is representative of the size, the shape, and the contour of the second surface 110 of the composite workpiece 102 as on the tool 104 (e.g., in the as-built condition on the tool 104) relative to a reference frame 168 (e.g., as shown in FIG. 12). In one or more examples, the reference frame 168 is a workpiece reference frame.

In one or more examples, the composite workpiece 102 is digitized, the scan data 216 is generated, and the workpiece model 150 is created before the hole 118 is drilled through the composite workpiece 102. In one or more examples, the composite workpiece 102 is digitized, the scan data 216 is generated, and the workpiece model 150 is created, or modified, after the hole 118 is drilled through the composite workpiece 102. As such, in one or more examples, the workpiece model 150 is also representative of a location and geometry of the hole 118 relative to the reference frame 168.

Figure 13:
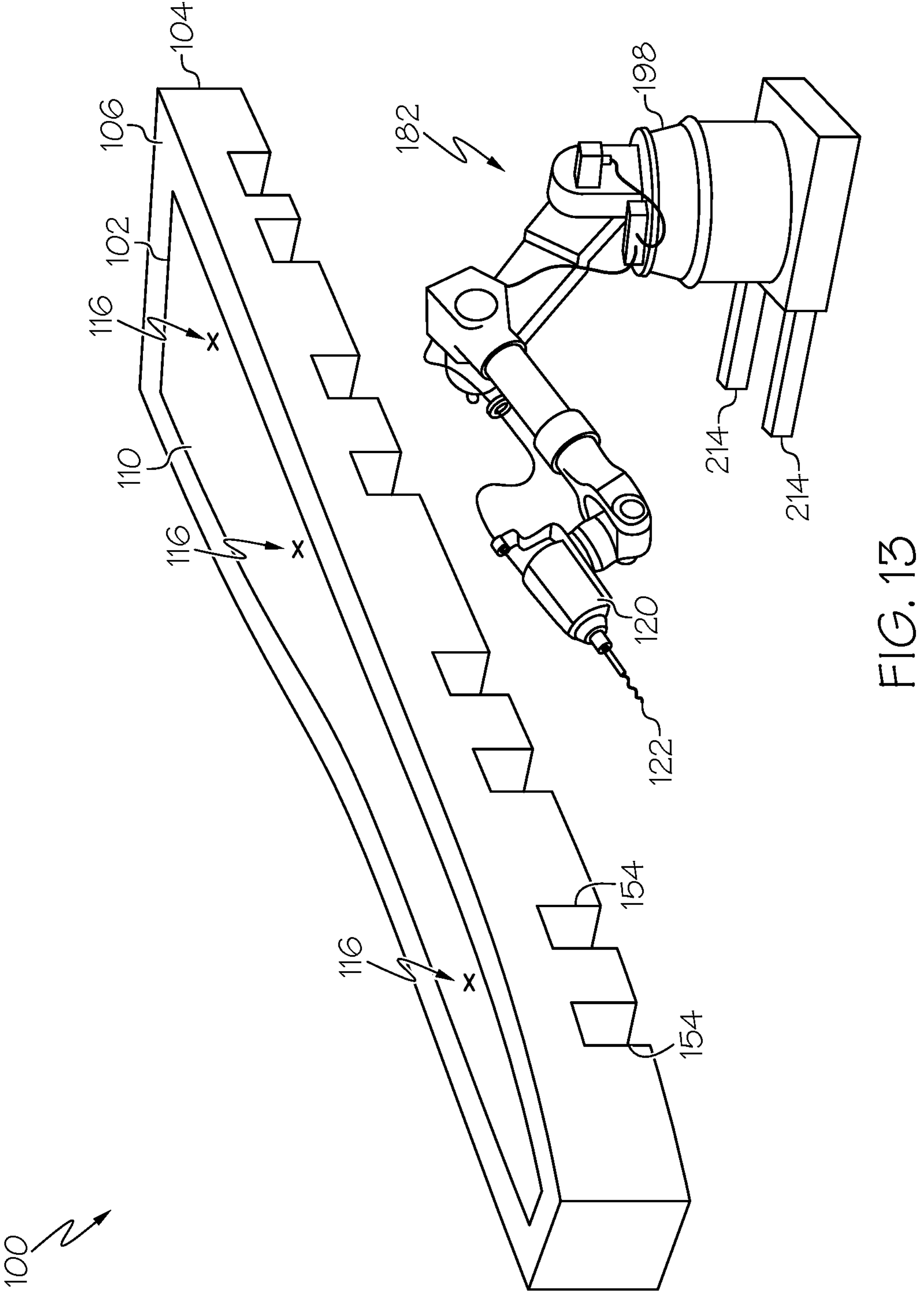
FIG. 13 is a schematic, perspective view of an example of the tool, the composite workpiece on the tool, and automated drilling machine.

Referring now to FIG. 13, which schematically illustrates an example of the tool 104, the composite workpiece 102 on the tool 104, and an automated drilling machine 182. In one or more examples, the system 100 automatically or semi-automatically drills the hole 118 through the composite workpiece 102 at the drilling location 116 while the composite workpiece 102 is on the tool 104. In such examples, the system 100 includes the automated drilling machine 182.

In one or more examples, the automated drilling machine 182 includes a robotic arm 198 or other programmable movement mechanism. The drill 120 is coupled to an end (e.g., an end effector) of the robotic arm 198. The robotic arm 198 selectively and controllably moves the drill 120 in three-dimensional space, for example, relative to the tool 104 and relative to the composite workpiece 102. The automated drilling machine 182 receives instructions from the computing device 146. For example, the automated drilling machine 182 may operate according to a numerical control (NC) program (e.g., program code 196) executed by the computing device 146 to automatically locate the drill 120 at the drilling location 116 and to drill the hole 118 through the composite workpiece 102 at the drilling location 116.

Figure 14:
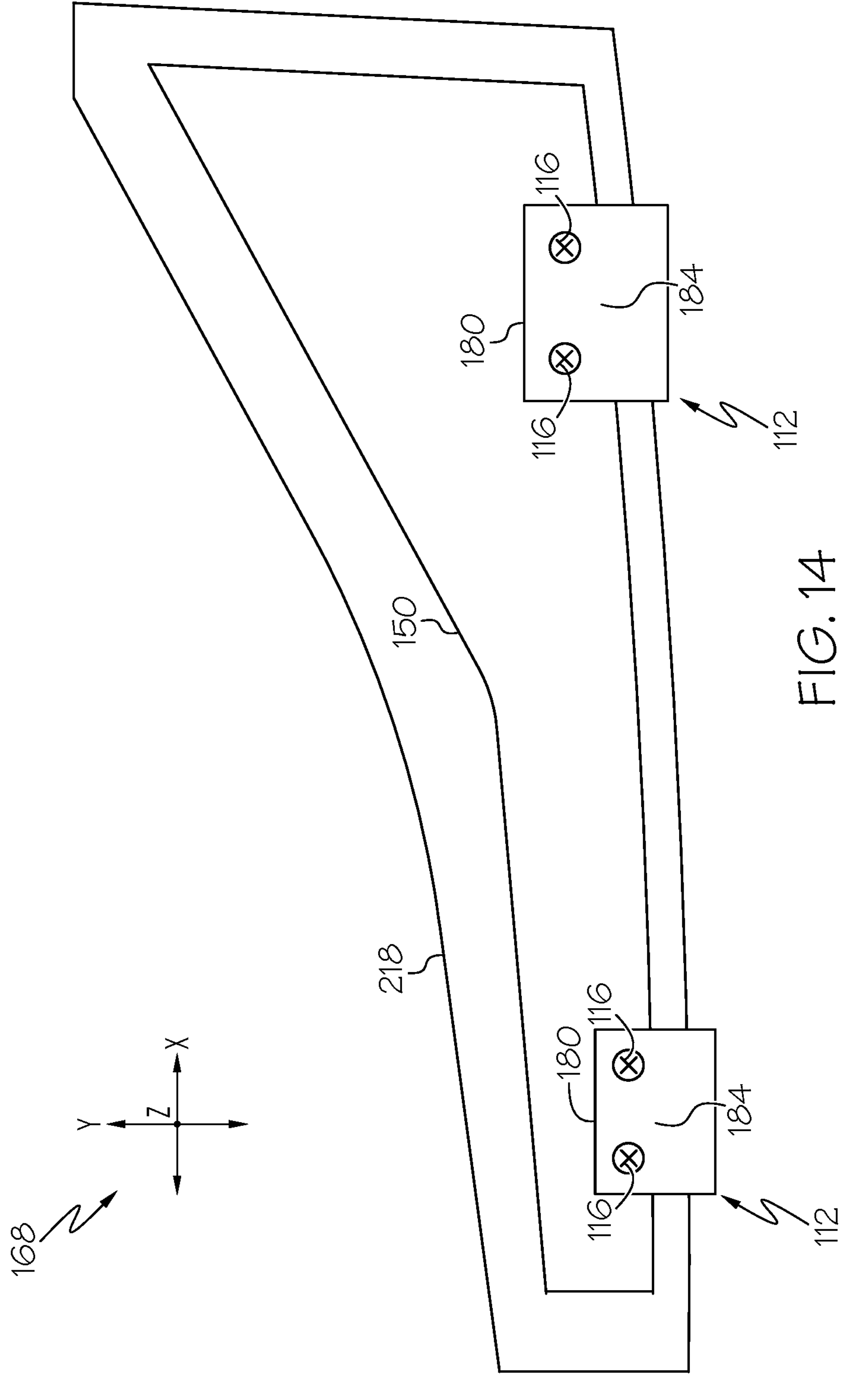
FIG. 14 is a schematic, top plan view of a workpiece model and the drill guide.

Referring now to FIG. 14, which schematically illustrates an example of the workpiece model 150. In one or more examples, such as examples in which the drilling operation is performed automatically using the automated drilling machine 182, the drill template 112 is, or takes the form of, a virtual template 180 (e.g., a no-physical template). For example, the virtual template 180 is carried out, accessed, and/or stored by means of the computing device 146, such as made by software (e.g., the program code 196). The workpiece model 150 and the virtual template 180 are used by the computing device 146 to determine the drilling location 116 on the composite workpiece 102.

In one or more examples, the computing device 146 is adapted to locate the virtual template 180 relative to the workpiece model 150 such that a virtual drill guide 184 of the virtual template 180 is indexed to the sacrificial portion 128 of the tool 104. The computing device 146 is also adapted to determine the drilling location 116 relative to the reference frame 168 based on the virtual drill guide 184. The computing device 146 is further adapted to instruct the automated drilling machine 182 to drill the hole 118 at the drilling location 116.

In one or more examples, the computing device 146 is adapted to perform various transforms (e.g., rigid body transforms and/or coordinate frame transforms) and/or other data manipulation operations to virtually locate the workpiece model 150 relative to a tool model 218 that represents the location of the composite workpiece 102 relative to the tool 104. The computing device 146 is also adapted to perform various transforms and/or other data manipulation operations to virtually locate the virtual template 180 relative to the tool model 218 such that the virtual drill guide 184 is aligned with the location of the sacrificial portion 128 of the tool 104 represented by the tool model 218. With the workpiece model 150 and the virtual template 180 located relative to the tool model 218, the computing device 146 determines the drilling location 116 (e.g., XYZ-coordinates) relative to the reference frame 168. The computing device 146 is also adapted to modify the NC program and/or compensate an NC machine reference frame based on the drilling location 116.

The tool model 218 is representative of the geometry, contour, and physical features of the tool 104, such as the geometry and location of the sacrificial portion 128, relative to a tool reference frame. In one or more examples, the tool 104 is digitized by the scanner 144 before the composite workpiece 102 is located on the tool surface 106.

Referring again to FIG. 13, in one or more examples, the automated drilling machine 182 is indexed to the tool 104 before being instructed to drill the hole 118 through the composite workpiece 102 on the tool 104. In one or more examples, the tool 104 includes a tool-indexing feature 154. The automated drilling machine 182 includes a machine-indexing feature 214. The machine-indexing feature 214 is configured to mate with the tool-indexing feature 154 to index the automated drilling machine 182 relative to the tool 104.

In one or more examples, the machine-indexing feature 214 includes at least one projection (e.g., a fork) and the tool-indexing feature 154 includes at least one opening (e.g., a mouse hole) that is configured to receive the machine-indexing feature 214. However, in other examples, the machine-indexing feature 214 and the tool-indexing feature 154 may include, or take the form of, any one of various other physical indexing structures (e.g., probes, indexing pins, etc.) or visual indexing features (e.g., optical targets and vision-based or laser-based detectors).

Referring now to FIG. 15, which schematically illustrates an example of the composite workpiece 102 and the second work cell 206 of the manufacturing environment 200, in which a subsequent post-cure processing operation is performed on the composite workpiece 102. In one or more examples, the workpiece model 150 is used to index the composite workpiece 102 to the second work cell 206 for a subsequent processing operation.

In one or more examples, the composite workpiece 102 is loaded in the second work cell 206. For example, the composite workpiece 102 is mounted to or is otherwise secured a tooling fixture 172. The composite workpiece 102 (e.g., as held by the tooling fixture 172) is then measured, scanned, or otherwise digitized in the second work cell 206 and a second workpiece model (e.g., a second three-dimensional model) of the composite workpiece 102 is generated that represents the position (e.g., location and orientation) and shape (e.g., contour) of the composite workpiece 102 in the second work cell 206 (e.g., relative to a work-cell reference frame 174). The second three-dimensional model is compared to the workpiece model 150 at an indexed position relative to the work-cell reference frame 174 and the composite workpiece 102 is conformed to the indexed position based on this comparison.

Referring to FIGS. 12 and 15, in one or more examples, the system 100 includes a material loader 152 (e.g., as shown in FIG. 12). The material loader 152 removes (e.g., separates and demolds) the composite workpiece 102 from the tool 104. In one or more examples, the system 100 also includes an overhead material handler 158. The overhead material handler 158 receives the composite workpiece 102 from the material loader 152 and transports the composite workpiece 102 from the first work cell 204 (e.g., as shown in FIG. 12) to the second work cell 206 for the subsequent processing operation. The overhead material handler 158 may also transport the composite workpiece 102 from the second work cell 206, following the processing operation, to the third work cell 208 for performance of a subsequent processing operation, and so on.

Referring to FIG. 12, in one or more examples, the material loader 152 is indexed to the tool 104 before removing the composite workpiece 102 from the tool 104. In one or more examples, the material loader 152 includes a loader-indexing feature 156. The loader-indexing feature 156 is configured to mate with the tool-indexing feature 154 to index the material loader 152 relative to the tool 104.

In one or more examples, the loader-indexing feature 156 includes at least one projection (e.g., a fork) and the tool-indexing feature 154 includes at least one opening (e.g., a mouse hole) that is configured to receive the loader-indexing feature 156. However, in other examples, the loader-indexing feature 156 and the tool-indexing feature 154 may include, or take the form of, any one of various other physical indexing structures (e.g., probes, indexing pins, etc.) or visual indexing features (e.g., optical targets and vision-based or laser-based detectors).

Referring to FIG. 15, in one or more examples, the overhead material handler 158 includes a support beam 164. The overhead material handler 158 also includes a hanger 166. The hanger 166 is connected to the support beam 164 and to the composite workpiece 102 such that the composite workpiece 102 is suspended from the support beam 164. In one or more examples, the hanger 166 is connected to the composite workpiece 102 at, or using, the hole 118 such that the composite workpiece 102 is suspended from the hanger 166 by the hole 118.

The present disclosure is also directed to a method for post-cure processing the composite workpiece 102 using the system 100. The present disclosure is also directed to a composite workpiece 102 that includes the hole 118, or the plurality of holes 186) formed while the composite workpiece 102 is on the tool 104 using the system 100.

Figure 16:
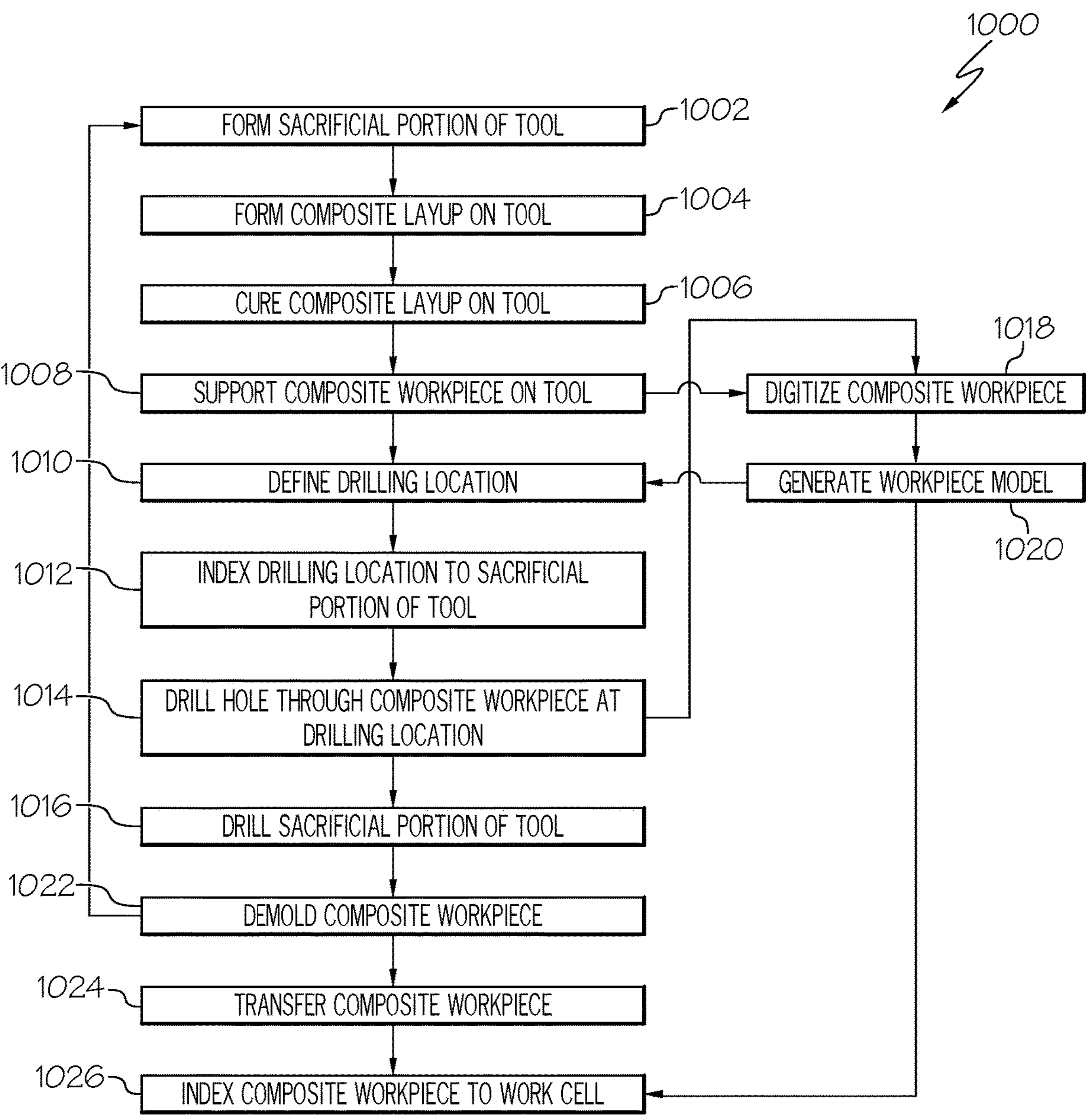
FIG. 16 is a schematic flow diagram of an example of a method for post-cure processing a composite workpiece.

Referring now to FIG. 16, which illustrates an example of a method 1000 for post-cure processing of the composite workpiece 102. In one or more examples, the method 1000 is implemented using the system 100.

In one or more examples, the method 1000 includes a step of (block 1002) forming the sacrificial portion 128 of the tool 104. In one or more examples, step of (block 1002) forming the sacrificial portion 128 includes a step of filling the recess 124 formed in the tool surface 106 of the tool 104 with the sacrificial material 126 such that the top surface 170 of the sacrificial material 126 (e.g., of the sacrificial portion 128) is flush with and forms a portion of the tool surface 106.

In one or more examples, the method 1000 includes a step of (block 1004) forming the composite layup on the tool surface 106 of the tool 104. Alternatively, the method includes a step of forming the composite layup on a dedicate layup tool and a step of transferring the composite layup to the tool 104 for curing.

In one or more examples, the method 1000 includes a step of (1006) curing the composite layup (e.g., an uncured or "green" composite) on the tool 104 to form the composite workpiece 102 (e.g., a cured composite).

In one or more examples, the method 1000 includes a step of (block 1008) supporting the composite workpiece 102 on the tool surface 106 of the tool 104.

In one or more examples, the method 1000 includes a step of (block 1010) defining the drilling location 116 on the composite workpiece 102 while the composite workpiece 102 is on the tool 104 using the drill template 112. In one or more examples, the step of (block 1010) defining the drilling location 116 is performed (e.g., determined) physically using the template body 178, coupled to the tool 104, and the drill guide 114, located over the sacrificial portion 128 of the tool 104. In one or more examples, step of (block 1010) defining the drilling location 116 is performed (e.g., determined) virtually using the virtual template 180.

In one or more examples, the method 1000 includes a step of (block 1012) indexing the drilling location 116 to the sacrificial portion 128 of the tool 104. In one or more examples, step of (block 1012) indexing the drilling location 116 to the sacrificial portion 128 is performed physically by coupling the template body 178 to the tool 104. In one or more examples, step of (block 1012) indexing the drilling location 116 to the sacrificial portion 128 is performed virtually using the workpiece model 150, the tool model 218, and the virtual template 180.

In one or more examples, the step of (block 1012) indexing the drilling location 116 to the sacrificial portion 128 of the tool 104 includes a step of indexing the drill template 112 to the tool 104 (e.g., coupling the template body 178 to the tool 104) to align the drill guide 114 (e.g., the template hole 192) of the drill template 112 with the sacrificial portion 128 of the tool 104.

In one or more examples, the step of (block 1012) indexing the drilling location 116 to the sacrificial portion 128 of the tool 104 includes a step of indexing the virtual template 180 relative to the workpiece model 150 such that the virtual drill guide 184 is aligned with the sacrificial portion 128 of the tool 104 and a step of determining the drilling location 116 relative to the reference frame 168 based on the virtual drill guide 184.

In one or more examples, the method 1000 includes a step of (block 1014) drilling the hole 118 through the composite workpiece 102 at the drilling location 116, defined by the drill template 112, while the composite workpiece 102 is on the tool 104. In one or more examples, step of (block 1014) drilling the hole 118 through the composite workpiece 102 is performed manually using the drill 120. In one or more examples, the step of (block 1014) drilling the hole 118 through the composite workpiece 102 is performed automatically or semi-automatically using the automated drilling machine 182, such as by instructing the automated drilling machine 182 to automatically drill the hole 118 through the composite workpiece 102 on the tool 104 at the drilling location 116.

In one or more examples, the method 1000 includes a step of (block 1016) drilling the sacrificial portion 128 of the tool 104 while drilling the hole 118 through the composite workpiece 102 while the composite workpiece 102 is on the tool 104. In one or more examples, the step of (block 1016) drilling the sacrificial portion 128 of the tool 104 includes a step of drilling the sacrificial material 126 of the sacrificial portion 128 and a step of penetrating the recess 124 of the sacrificial portion 128.

In one or more examples, the method 1000 includes a step of (block 1018) digitizing at least a portion the composite workpiece 102 while the composite workpiece 102 is on the tool 104.

In one or more examples, the step of (block 1018) digitizing the composite workpiece 102 is performed before the step of (block 1014) drilling the hole 118 through the composite workpiece 102 on the tool 104. In these examples, the workpiece model 150 is representative of at least the contour of the second surface 110 of the composite workpiece 102 relative to the reference frame 168.

In one or more examples, the step of (block 1018) digitizing the composite workpiece 102 is performed (or is performed again) after the step of (block 1014) drilling the hole 118 through the composite workpiece 102. In these examples, the workpiece model 150 is also representative of the location of the hole 118 relative to the reference frame 168.

In one or more examples, the method 1000 includes a step of (block 1020) generating the workpiece model 150 that is representative of at least a portion of the composite workpiece 102, such as of at least the contour of the composite workpiece 102 as on the tool 104.

In one or more examples, the method 1000 includes a step of (block 1022) demolding the composite workpiece 102 from the tool 104. In one or more examples, the step of (block 1022) demolding the composite workpiece 102 includes a step of separating the composite workpiece 102 from the tool surface 106 and a step of removing the composite workpiece 102 from the tool 104. In one or more examples, the step of (block 1022) is preformed automatically or semi-automatically using the material loader 152. In one or more examples, the step of (block 1022) is performed manually.

In one or more examples, the method 1000 includes a step of (block 1024) transferring the composite workpiece 102 to a subsequent work cell (e.g., the second work cell 206) for performance of a subsequent post-cure processing operation. In one or more examples, the step of (block 1024) transferring the composite workpiece 102 includes a step of transferring the composite workpiece 102 from the tool 104 to the overhead material handler 158 and a step of moving the composite workpiece 102 to the subsequent work cell using the overhead material handler 158. In one or more examples, the step of transferring the composite workpiece 102 from the tool 104 to the overhead material handler 158 is performed using the material loader 152. In one or more examples, transferring the composite workpiece 102 from the tool 104 to the overhead material handler 158 is performed manually. In one or more examples, the step of transferring the composite workpiece 102 to the overhead material handler 158 includes a step of coupling the hanger 166 of the overhead material handler 158 to the composite workpiece 102 using the hole 118 drilled through the composite workpiece 102 and a step of suspending the composite workpiece 102 from the support beam 164 of the overhead material handler 158.

In one or more examples, the method 1000 includes a step of transferring the composite workpiece 102 from the overhead material handler 158 to the tooling fixture 172 located in the subsequent work cell (e.g., the second work cell 206 as shown in FIG. 13). In one or more examples, the method 1000 includes a step of performing the subsequent processing operation (e.g., a machining operation, a trimming operation, a coating operation, and the like) on the composite workpiece 102 while the composite workpiece 102 is on, or is being held by, the tooling fixture 172.

In one or more examples, the method 1000 includes a step of (block 1026) indexing the composite workpiece 102 to the subsequent work cell (e.g., the second work cell 206) for the subsequent processing operation by conforming the workpiece model 150 to the work-cell reference frame 174. In one or more examples, the step of (block 1026) indexing the composite workpiece 102 includes a step of conforming the composite workpiece 102 to the workpiece model 150.

In one or more examples, the method 1000 includes a step of reforming (e.g., replacing or repairing) the sacrificial portion 128 of the tool 104 after the hole 118 is drilled through the composite workpiece 102, after the composite workpiece 102 is removed (e.g., demolded) from the tool 104, and before a subsequent composite workpiece is located on the tool 104. For example, remnants of the sacrificial material 126 are removed and/or cleaned from within the recess 124 and the sacrificial material 126 is replaced to fill the recess 124.

The present disclosure is also directed to a system of post-cure processing the composite workpiece 102 implemented according to the method 1000. The present disclosure is further directed to the composite workpiece 102 that includes the hole 118 or the plurality of holes 186 formed while the composite workpiece 102 is on the tool 104 according to the method 1000.

Figure 17:
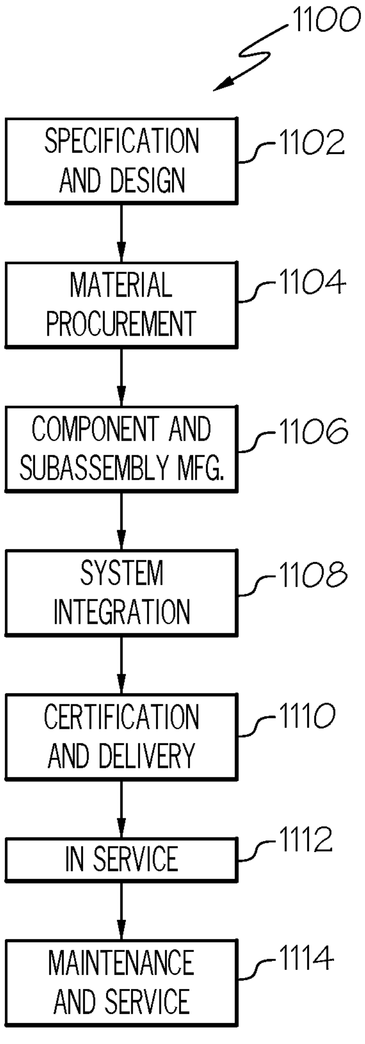
FIG. 17 is a flow diagram of an example of an aircraft manufacturing and service method.

Referring now to FIGS. 17 and 18, examples of the system 100, the method 1000, and the composite workpiece 102 may be related to, or used in the context of, an aircraft manufacturing and service method 1100, as shown in the flow diagram of FIG. 17 and the aircraft 1200, as schematically illustrated in FIG. 18. For example, the aircraft 1200 and/or the aircraft production and service method 1100 may utilize the composite workpiece 102 that is machined using the system 100, described herein and illustrated in FIGS. 1-15, and/or according to the method 1000, described herein and illustrated in FIG. 16.

Referring to FIG. 18, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a flight control system, a guidance system, a weapons system, and the like. In one or more examples, the composite workpiece 102 made (e.g., machined and/or processed) using the system 100 and/or according to the method 1000 forms a component of the airframe 1202, such as a wing 1220, a fuselage 1218, a panel, a stringer, a spar, and the like.

Referring to FIG. 17, during pre-production, the service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the service method 1100 illustrated in FIG. 17 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000 shown and described herein may be employed during any one or more of the stages of the manufacturing and service method 1100 shown in the flow diagram illustrated by FIG. 17. In an example, manufacture of the composite workpiece 102 in accordance with the method 1000 and/or using the system 100 may form a portion of component and subassembly manufacturing (block 1106) and/or system integration (block 1108). Further, the composite workpiece 102 manufactured in accordance with the method 1000 and/or using the system 100 may be utilized in a manner similar to components or subassemblies prepared while the aircraft 1200 is in service (block 1112). Also, the composite workpiece 102 manufactured in accordance with the method 1000 and/or using the system 100 may be utilized during system integration (block 1108) and certification and delivery (block 1110). Similarly, manufacture of the composite workpiece 102 in accordance with the method 1000 and/or using the system 100 may be utilized, for example and without limitation, while the aircraft 1200 is in service (block 1112) and during maintenance and service (block 1114). For example, spare and or replacement composite parts may be fabricated in accordance with the method 1000 and/or using the system 100, which may be installed due to a prescribed maintenance cycle or after a realization of damage to a composite part.

In can be appreciated that performing at least a portion of the post-cure processing operation on the composite workpiece 102 while the composite workpiece 102 is on the tool 104, using the workpiece model 150 to index the composite workpiece 102 in one or more of the plurality of work cells 202, and updating the workpiece model 150 after each subsequent processing operation may improve the accuracy and speed of the processing operation and enable determinate or predictive assembly of the composite workpiece 102.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite structures, systems, and methods of making the same for other types of vehicles (e.g., land vehicles, marine vehicles, space vehicles, etc.) and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of the present disclosure, the term "position" of an item refers to a location of the item in three-dimensional space relative to a fixed reference frame and an angular orientation of the item in three-dimensional space relative to the fixed reference frame.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-15 and 18, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-15 and 18, referred to above, need be included in every example and not all elements, features, and/or components described herein are necessarily depicted in each illustrative example. Accordingly, some of the elements, features, and/or components described and illustrated in FIGS. 1-15 and 18 may be combined in various ways without the need to include other features described and illustrated in FIGS. 1-15 and 18, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-15 and 18, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-15 and 18, and such elements, features, and/or components may not be discussed in detail herein with reference to each of FIGS. 1-15 and 18. Similarly, all elements, features, and/or components may not be labeled in each of FIGS. 1-15 and 18, but reference numerals associated therewith may be utilized herein for consistency.

In FIGS. 16 and 17, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 16 and 17 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, and the composite workpiece 102 have been shown and described, modifications may occur to those skilled in the art upon reading the specification. The present application includes such modifications and is limited only by the scope of the claims.

What is claimed is:

1. A system for post-cure processing of a composite workpiece, the system comprising:
- a tool comprising:
  - a tool surface that supports the composite workpiece located on the tool; and
  - a sacrificial portion that forms a portion of the tool surface; and
- a drill template that indexes a drilling location to the sacrificial portion for drilling a hole through the composite workpiece while the composite workpiece is on the tool.

2. The system of claim 1, further comprising a drill to drill the hole through the composite workpiece at the drilling location, defined by the drill template, while the composite workpiece is on the tool, wherein:
- the drill comprises a drill bit; and
- the sacrificial portion of the tool receives a portion of the drill bit after the drill bit passes through the composite workpiece.

3. The system of claim 1, wherein:
- the sacrificial portion of the tool comprises:
  - a recess formed in the tool surface; and
  - a sacrificial material within the recess and having a top surface that is substantially flush with the tool surface; and
- a portion of a drill bit penetrates the recess, drilling the sacrificial material, when drilling the hole through the composite workpiece according to the drill template while the composite workpiece is on the tool.

4. The system of claim 1, wherein:
- the drill template comprises:
  - a template body coupled to the tool; and
  - a template hole formed through the template body; and
- the template hole defines the drilling location.

5. The system of claim 4, wherein:
- the tool surface supports a first surface of the composite workpiece; and
- the template body locates the template hole relative to a second surface of the composite workpiece, which is opposite the first surface.

6. The system of claim 5, wherein:
- the tool further comprises a first template-indexing feature;
- the drill template further comprises a second template-indexing feature; and
- the second template-indexing feature mates with the first template-indexing feature to locate the template hole adjacent to the second surface of the composite workpiece and to align the template hole with the sacrificial portion of the tool.

7. The system of claim 5, wherein:
- the tool further comprises a side surface that extends from the tool surface; and
- the drill template is coupled to the side surface and extends over the second surface of the composite workpiece while the composite workpiece is on the tool.

8. The system of claim 1, further comprising:
- a scanner to digitize at least a portion the composite workpiece while the composite workpiece is on the tool; and
- a computing device adapted to generate a workpiece model representative of the composite workpiece.

9. The system of claim 8, wherein:
- the workpiece model is representative of a contour of the composite workpiece as on the tool;
- the drill template is a virtual template; and
- the computing device is further adapted to:
  - locate the virtual template relative to the workpiece model such that a virtual drill guide is indexed to the sacrificial portion of the tool;
  - determine the drilling location relative to a reference frame based on the virtual drill guide; and
  - instruct an automated drilling machine to drill the hole at the drilling location.

10. The system of claim 8, wherein the workpiece model is representative of a contour of the composite workpiece as on the tool and a location of the hole relative to a reference frame.

11. The system of claim 10, wherein the workpiece model is used to index the composite workpiece to a work cell for a subsequent processing operation.

12. A system for post-cure processing of a composite workpiece, the system comprising:
a tool comprising:
a tool surface that supports the composite workpiece located on the tool; and
a sacrificial portion forming a portion of the tool surface;
a drill template that indexes a drilling location on the composite workpiece to the sacrificial portion of the tool; and
a drill, comprising a drill bit for drilling a hole through the composite workpiece at the drilling location, defined by the drill template, while the composite workpiece is on the tool,
wherein a portion of the drill bit penetrates the sacrificial portion of the tool after the drill bit passes through the composite workpiece.

13. The system of claim 12, wherein:
the drill template comprises:
a template body coupled to the tool; and
a template hole formed through the template body; and
the template hole defines the drilling location.

14. The system of claim 12, further comprising:
a scanner to digitize the composite workpiece while the composite workpiece is on the tool; and
a computing device adapted to generate a workpiece model,
wherein the workpiece model is representative of a contour of the composite workpiece as on the tool.

15. The system of claim 14, wherein:
the drill template is a virtual template; and
the computing device is further adapted to:
locate the virtual template relative to the workpiece model such that a virtual drill guide is indexed to the sacrificial portion of the tool; and
determine the drilling location relative to a reference frame based on the virtual drill guide; and
instruct an automated drilling machine to drill the hole at the drilling location.

16. The system of claim 14, wherein:
the workpiece model is further representative of a location of the hole relative to a reference frame; and
the workpiece model is used to index the composite workpiece to a work cell for a subsequent processing operation.

17. A method for post-cure processing a composite workpiece, the method comprising steps of:
supporting the composite workpiece on a tool surface of a tool;
indexing a drilling location on the composite workpiece to a sacrificial portion of the tool while the composite workpiece is on the tool using a drill template, wherein the sacrificial portion forms a portion of the tool surface;
drilling a hole through the composite workpiece at the drilling location, defined by the drill template, while the composite workpiece is on the tool; and
drilling the sacrificial portion of the tool while drilling the hole through the composite workpiece while the composite workpiece is on the tool.

18. The method of claim 17, wherein the step of indexing the drilling location to the sacrificial portion of the tool comprises indexing the drill template to the tool to align a template hole of the drill template with the sacrificial portion of the tool.

19. The method of claim 17, further comprising steps of:
digitizing the composite workpiece while the composite workpiece is on the tool; and
generating a workpiece model that is representative of a contour of the composite workpiece as on the tool,
wherein:
the drill template is a virtual template;
the step of indexing the drilling location to the sacrificial portion of the tool comprises:
indexing the virtual template relative to the workpiece model such that a virtual drill guide is aligned with the sacrificial portion of the tool; and
determining the drilling location relative to a reference frame based on the virtual drill guide; and
the step of drilling the hole through the composite workpiece comprises instructing an automated drilling machine to drill the hole at the drilling location.

20. The method of claim 19, wherein:
the step of digitizing the composite workpiece is performed after the step of drilling the hole through the composite workpiece; and
the workpiece model is further representative of a location of the hole relative to a reference frame.

* * * * *